United States Patent
Choi et al.

(10) Patent No.: US 10,412,677 B2
(45) Date of Patent: Sep. 10, 2019

(54) METHOD AND DEVICE FOR AN ENHANCED DISTRIBUTED CHANNEL ACCESS (EDCA) TRANSMISSION

(71) Applicant: LG ELECTRONICS INC., Seoul (KR)

(72) Inventors: Hyeyoung Choi, Seoul (KR); Kiseon Ryu, Seoul (KR); Jeongki Kim, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/564,015

(22) PCT Filed: Apr. 11, 2016

(86) PCT No.: PCT/KR2016/003789
§ 371 (c)(1),
(2) Date: Oct. 3, 2017

(87) PCT Pub. No.: WO2016/163850
PCT Pub. Date: Oct. 13, 2016

(65) Prior Publication Data
US 2018/0139699 A1    May 17, 2018

Related U.S. Application Data

(60) Provisional application No. 62/183,195, filed on Jun. 23, 2015, provisional application No. 62/144,945, filed on Apr. 9, 2015.

(51) Int. Cl.
*H04W 52/02* (2009.01)
*H04W 48/02* (2009.01)
(Continued)

(52) U.S. Cl.
CPC ....... *H04W 52/0238* (2013.01); *H04W 48/02* (2013.01); *H04W 52/0216* (2013.01);
(Continued)

(58) Field of Classification Search
CPC ... H04W 52/0238; H04W 4/70; H04W 48/02; H04W 52/0216; H04W 74/00;
(Continued)

(56) References Cited

U.S. PATENT DOCUMENTS 7,899,018 B2 *  3/2011  Balasubramanian ........................ H04W 84/18 370/252
8,416,739 B2 *  4/2013  Li .......................... H04L 1/1861 370/328

(Continued)

FOREIGN PATENT DOCUMENTS

JP    2007-166569 A    6/2007
KR    10-2008-0044237 A    5/2006
(Continued)

*Primary Examiner* — Omar J Ghowrwal
*Assistant Examiner* — Kokou R Detse
(74) *Attorney, Agent, or Firm* — Birch, Stewart, Kolasch & Birch, LLP

(57) ABSTRACT

According to one embodiment of the present invention, a method by which an access point (AP) transmits and receives a frame in a wireless communication system comprises the steps of: receiving, from STA, an uplink signal including predetermined information; determining whether to transmit, to the STA, information related to the stopping an EDCA, on the basis of the predetermined information and/or the uplink signal; and transmitting, to the STA, the information related to the stopping of an EDCA when the information related to the stopping of an EDCA is determined to be transmitted to the STA.

2 Claims, 14 Drawing Sheets

(51) Int. Cl.
*H04W 74/08* (2009.01)
*H04W 74/00* (2009.01)
*H04W 84/12* (2009.01)
*H04W 4/70* (2018.01)
*H04L 5/00* (2006.01)

(52) U.S. Cl.
CPC ......... *H04W 74/006* (2013.01); *H04W 74/08* (2013.01); *H04L 5/0055* (2013.01); *H04W 4/70* (2018.02); *H04W 52/0245* (2013.01); *H04W 74/008* (2013.01); *H04W 84/12* (2013.01); *Y02D 70/00* (2018.01); *Y02D 70/10* (2018.01); *Y02D 70/12* (2018.01); *Y02D 70/122* (2018.01); *Y02D 70/126* (2018.01); *Y02D 70/1224* (2018.01); *Y02D 70/1262* (2018.01); *Y02D 70/1264* (2018.01); *Y02D 70/14* (2018.01); *Y02D 70/142* (2018.01); *Y02D 70/146* (2018.01); *Y02D 70/21* (2018.01); *Y02D 70/22* (2018.01)

(58) Field of Classification Search
CPC ..... H04W 74/08; H04W 84/12; H04W 88/08; H04W 52/0245; H04L 5/0055
USPC ........................................................ 370/311
See application file for complete search history.

(56) References Cited

U.S. PATENT DOCUMENTS

| | | | |
|---|---|---|---|
| 9,609,090 B2* | 3/2017 | Lee | H04L 69/22 |
| 2005/0221838 A1* | 10/2005 | Cha | H04B 7/0408 455/452.2 |
| 2012/0257588 A1* | 10/2012 | Umeda | H04L 5/001 370/329 |
| 2014/0153505 A1* | 6/2014 | Pantelidou | H04W 28/065 370/329 |
| 2017/0150493 A1* | 5/2017 | Seok | H04B 7/0452 |

FOREIGN PATENT DOCUMENTS

| WO | WO 2013/154401 A1 | 10/2013 |
|---|---|---|
| WO | WO 2014/092487 A1 | 8/2014 |
| WO | WO 2015/020377 A1 | 2/2015 |

\* cited by examiner

FIG. 16
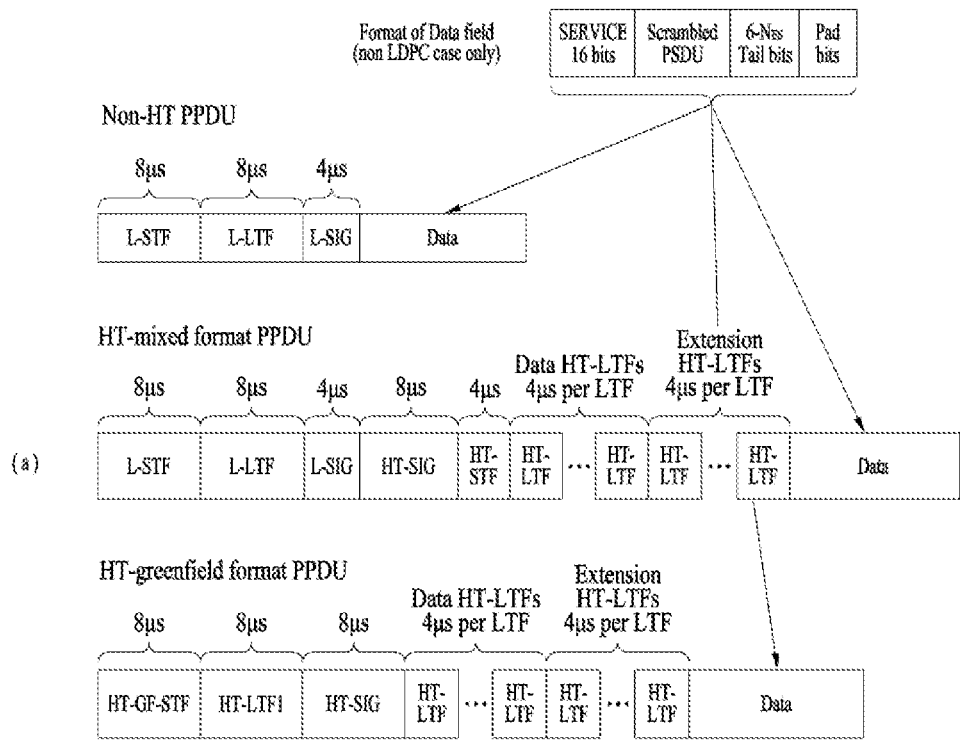
(b)
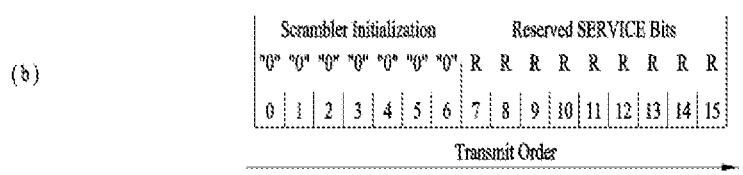
FIG. 17
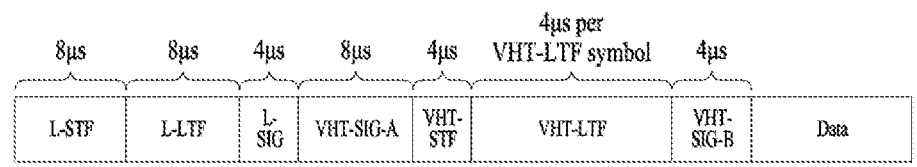

FIG. 18

|  | B0 | B1 | B2 | B3 | B4 B9 | B10 B12 | B13 B15 | B16 B18 | B19 B21 | B22 | B23 |
|---|---|---|---|---|---|---|---|---|---|---|---|
| Composite Name : | BW | Reserved | STBC | Group ID | NSTS / Partial AID ||||  TXOP PS NOT ALLOWED | Reserved |
| SU Name : | BW | Reserved | STBC | Group ID | SU NSTS | Partial AID |||  TXOP PS NOT ALLOWED | Reserved |
| MU Name : | BW | Reserved | STBC | Group ID | MU[0] NSTS | MU[1] NSTS | MU[2] NSTS | MU[3] NSTS |  | TXOP PS NOT ALLOWED | Reserved |
| Bits : | 2 | 1 | 1 | 6 | 3 | 3 | 3 | 3 |  | 1 | 1 |

( a ) VHT-SIG-A1 structure

|  | B0 | B1 | B2 | B3 | B4 | B5 | B6 | B7 | B8 | B9 | B10 B27 | B18 | B23 |
|---|---|---|---|---|---|---|---|---|---|---|---|---|---|
| Composite Name : | Short GI | Short GI NSYM Disambiguation | SU/MU[0] Coding | LDPC Extra OFDM Symbol | SU VHT-MCS/MU[1-3] Coding ||||  Beam-formed | Reserved | CRC | Tail |
| SU Name : | Short GI | Short GI NSYM Disambiguation | SU/MU[0] Coding | LDPC Extra OFDM Symbol | SU VHT-MCS ||||  Beam-formed | Reserved | CRC | Tail |
| MU Name : | Short GI | Short GI NSYM Disambiguation | SU/MU[0] Coding | LDPC Extra OFDM Symbol | MU[1] Coding | MU[2] Coding | MU[3] Coding | Reserved | Reserved |  | Reserved | CRC | Tail |
| Bits : | 1 | 1 | 1 | 1 | 1 | 1 | 1 | 1 | 1 | 1 |  | 8 | 6 |

( b ) VHT-SIG-A2 structure

FIG. 19

(a) HE PPDU format (b) HE PPDU format (c) HE PPDU format

METHOD AND DEVICE FOR AN ENHANCED DISTRIBUTED CHANNEL ACCESS (EDCA) TRANSMISSION

CROSS REFERENCE TO RELATED APPLICATIONS

This application is the National Phase of PCT International Application No. PCT/KR2016/003789, filed on Apr. 11, 2016, which claims priority under 35 U.S.C. 119(e) to U.S. Provisional Application No. 62/144,945, filed on Apr. 9, 2015, and No. 62/183,195, filed on Jun. 23, 2015, all of which are hereby expressly incorporated by reference into the present application.

TECHNICAL FIELD

Following description relates to a wireless communication system, and more particularly, to a method of transmitting and receiving a frame related to selection/determination of an access method.

BACKGROUND ART

With recent development of information communication technologies, a variety of wireless communication technologies have been developed. Among such technologies, WLAN allows wireless Internet access at home, in businesses, or in specific service providing areas using a mobile terminal, such as a personal digital assistant (PDA), a laptop computer, and a portable multimedia player (PMP), based on radio frequency technology.

In order to overcome limited communication speed, which has been pointed out as a weak point of WLAN, technical standards have recently introduced a system capable of increasing the speed and reliability of a network while extending a coverage region of a wireless network. For example, IEEE 802.11n supports high throughput (HT) with a maximum data processing speed of 540 Mbps. In addition, Multiple Input Multiple Output (MIMO) technology, which employs multiple antennas for both a transmitter and a receiver in order to minimize transmission errors and optimize data rate, has been introduced.

Machine-to-machine (M2M) communication technology has been discussed as a next generation communication technology. A technical standard to support M2M communication in the IEEE 802.11 WLAN system is also under development as IEEE 802.11ah. In M2M communication, a scenario in which a small amount of data is occasionally communicated at a low speed in an environment including a large number of devices may be considered.

In a wireless LAN system, communication is performed in a medium shared by all devices. If the number of devices increases in communication such as M2M communication, it is necessary to more efficiently enhance a channel access mechanism to reduce unnecessary power consumption and interference occurrence.

DISCLOSURE OF THE INVENTION

Technical Task

A technical task of the present invention is to provide a method of transmitting and receiving a frame related to an EDCA and random access selection.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting and receiving a frame, which is transmitted and received by an AP (access point) in a wireless communication system, includes the steps of receiving an uplink signal including prescribed information from an STA, determining whether to transmit information related to stopping of an EDCA to the STA based on at least one of the prescribed information and the uplink signal, and if it is determined to transmit the information related to the stopping of the EDCA to the STA, transmitting the information related to the stopping of the EDCA to the STA.

To further achieve these and other advantages and in accordance with the purpose of the present invention, according to a different embodiment, an AP (access point) in a wireless communication system includes a transceiver and a processor, the processor configured to receive an uplink signal including prescribed information from an STA, the processor configured to determine whether to transmit information related to stopping of an EDCA to the STA based on at least one of the prescribed information and the uplink signal, the processor, if it is determined to transmit the information related to the stopping of the EDCA to the STA, configured to transmit the information related to the stopping of the EDCA to the STA.

If either an MCS level or RSSI of the uplink signal is equal to or less than a predetermined threshold value, the AP can transmit the information related to the stopping of the EDCA.

The prescribed information may correspond to an uplink transmission attempt count of the STA. If the uplink transmission attempt count is equal to or greater than a predetermined threshold value, the AP can transmit the information related to the stopping of the EDCA.

The prescribed information may correspond to a more data field. If the STA receives a more data field set to 1 and fails to receive the uplink signal within a predetermined threshold value, the STA can transmit the information related to the stopping of the EDCA.

If information received from the STA corresponds to information indicating that there is data discarded by the STA, the STA can transmit the information related to the stopping of the EDCA.

If the prescribed information corresponds to retry indicator information, the STA can transmit the information related to the stopping of the EDCA.

If the STA performs uplink transmission and fails to receive DL ACK/BA more than a predetermined count, the retry indicator information can be included in the uplink signal.

Advantageous Effects

According to the present invention, it is able to determine an efficient access method when coverage is extended and the like.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 16 is a diagram for an example of a PPDU frame format of IEEE 802.11n system;

FIGS. 17 and 18 are diagrams for an example of a VHT PPDU frame format of IEEE 802.11ac system;

FIG. 19 is a diagram for an example of a PPDU format in 11ax;

BEST MODE

Mode for Invention

Figure 1:
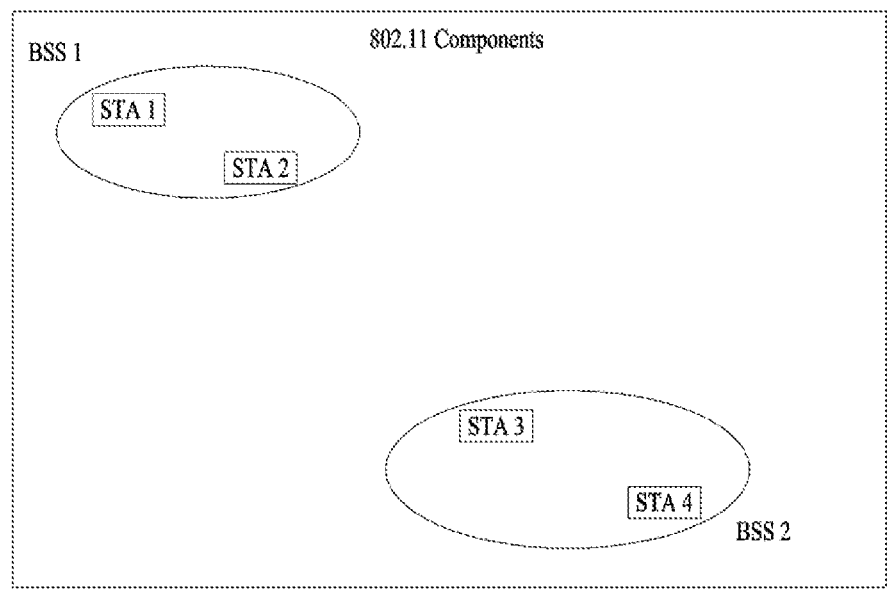
FIG. 1 is a diagram for an example of a structure of IEEE 802.11 system to which the present invention is applicable.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the scope and spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by standard documents disclosed for at least one of wireless access systems such as the institute of electrical and electronics engineers (IEEE) 802, 3rd generation partnership project (3GPP), 3GPP long term evolution (3GPP LTE), LTE-advanced (LTE-A), and 3GPP2 systems. For steps or parts of which description is omitted to clarify the technical features of the present invention, reference may be made to these documents. Further, all terms as set forth herein can be explained by the standard documents.

The following technology can be used in various wireless access systems such as systems for code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented by radio technology such as universal terrestrial radio access (UTRA) or CDMA2000. TDMA may be implemented by radio technology such as global system for mobile communications (GSM)/general packet radio service (GPRS)/enhanced data rates for GSM evolution (EDGE). OFDMA may be implemented by radio technology such as IEEE 802.11 (Wi-Fi)™, IEEE 802.16 (WiMAX)™, IEEE 802.20, evolved-UTRA (E-UTRA), etc. For clarity, the present disclosure focuses on 3GPP LTE and LTE-A systems. However, the technical features of the present invention are not limited thereto.

Structure of WLAN System

FIG. 1 is a diagram showing an exemplary structure of an IEEE 802.11 system to which the present invention is applicable.

The structure of the IEEE 802.11 system may include a plurality of components. A WLAN which supports transparent station (STA) mobility for a higher layer may be provided by mutual operations of the components. A basic service set (BSS) may correspond to a basic building block in an IEEE 802.11 LAN. In FIG. 1, two BSSs (BSS1 and BSS2) are present and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in a corresponding BSS maintain communication. This area may be referred to as a basic service area (BSA). If an STA moves out of the BSA, the STA cannot directly communicate with the other STAs in the corresponding BSA.

In the IEEE 802.11 LAN, the most basic type of BSS is an independent BSS (IBSS). For example, the IBSS may have a minimum form consisting of only two STAs. The BSS (BSS1 or BSS2) of FIG. 1, which is the simplest form and does not include other components except for the STAs, may correspond to a typical example of the IBSS. This configuration is possible when STAs can directly communicate with each other. Such a type of LAN may be configured as necessary instead of being prescheduled and is also called an ad-hoc network.

Memberships of an STA in the BSS may be dynamically changed when the STA becomes an on or off state or the STA enters or leaves a region of the BSS. To become a member of the BSS, the STA may use a synchronization process to join the BSS. To access all services of a BSS infrastructure, the STA should be associated with the BSS. Such association may be dynamically configured and may include use of a distributed system service (DSS).

Figure 2:
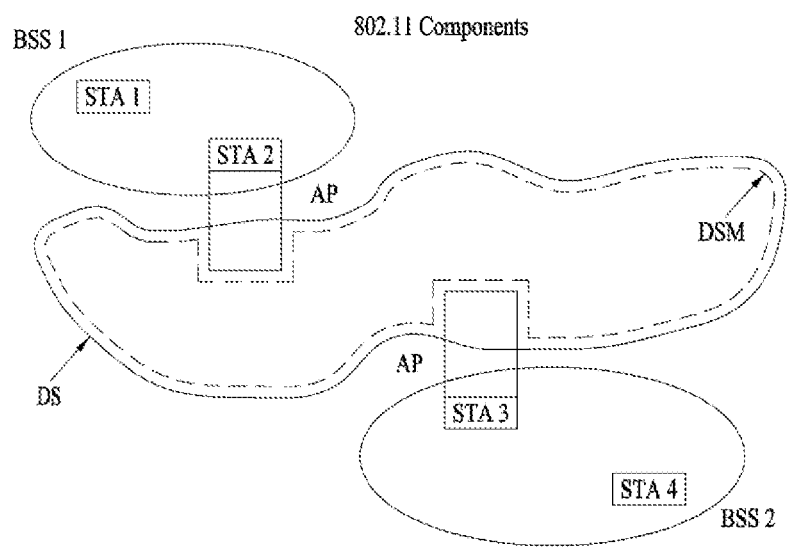
FIG. 2 is a diagram for a different example of a structure of IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be restricted by physical (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a wireless medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data can be moved between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not necessarily be identical to an address used by the AP for communication on the DSM.

Data transmitted from one of STAs associated with the AP to an STA address of the AP may be always received by an uncontrolled port and may be processed by an IEEE 802.1X port access entity. If the controlled port is authenticated, transmission data (or frame) may be transmitted to the DS.

Figure 3:
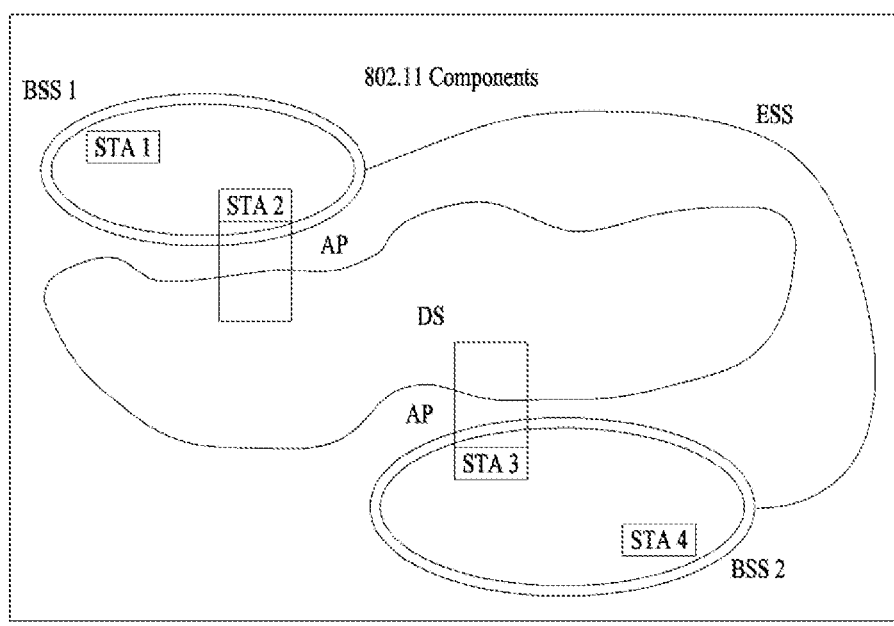
FIG. 3 is a diagram for a further different example of a structure of IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a logical link control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One (or more than one) IBSS or ESS networks may be physically located in the same space as one (or more than one) ESS network. This may correspond to an ESS network form in the case in which an ad-hoc network operates in a location in which an ESS network is present, the case in which IEEE 802.11 networks different organizations physically overlap, or the case in which two or more different access and security policies are necessary in the same location.

Figure 4:
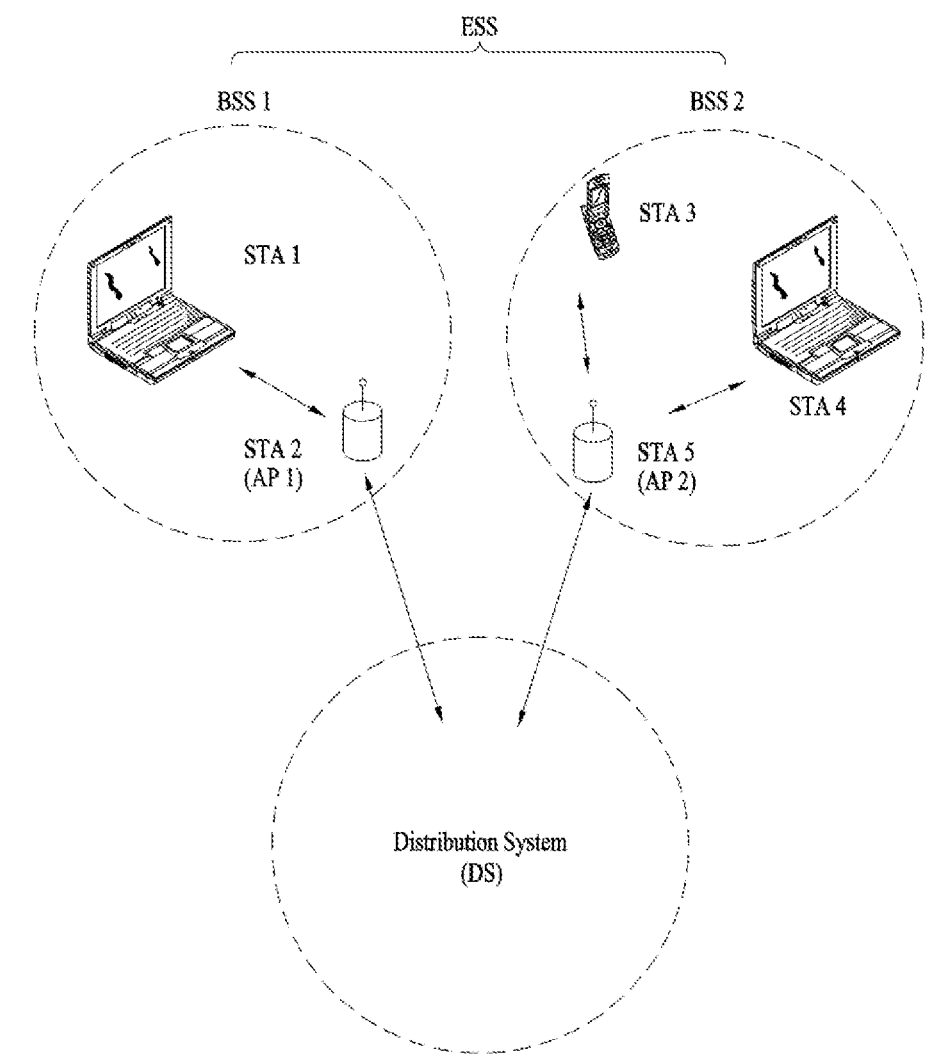
FIG. 4 is a diagram for an example of a structure of a wireless LAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a wireless transmit/receive unit (WTRU), a user equipment (UE), a mobile station (MS), a mobile terminal, or a mobile subscriber station (MSS). The AP is a concept corresponding to a base station (BS), a Node-B, an evolved Node-B (eNB), a base transceiver system (BTS), or a femto BS in other wireless communication fields.

Link Setup Process

Figure 5:
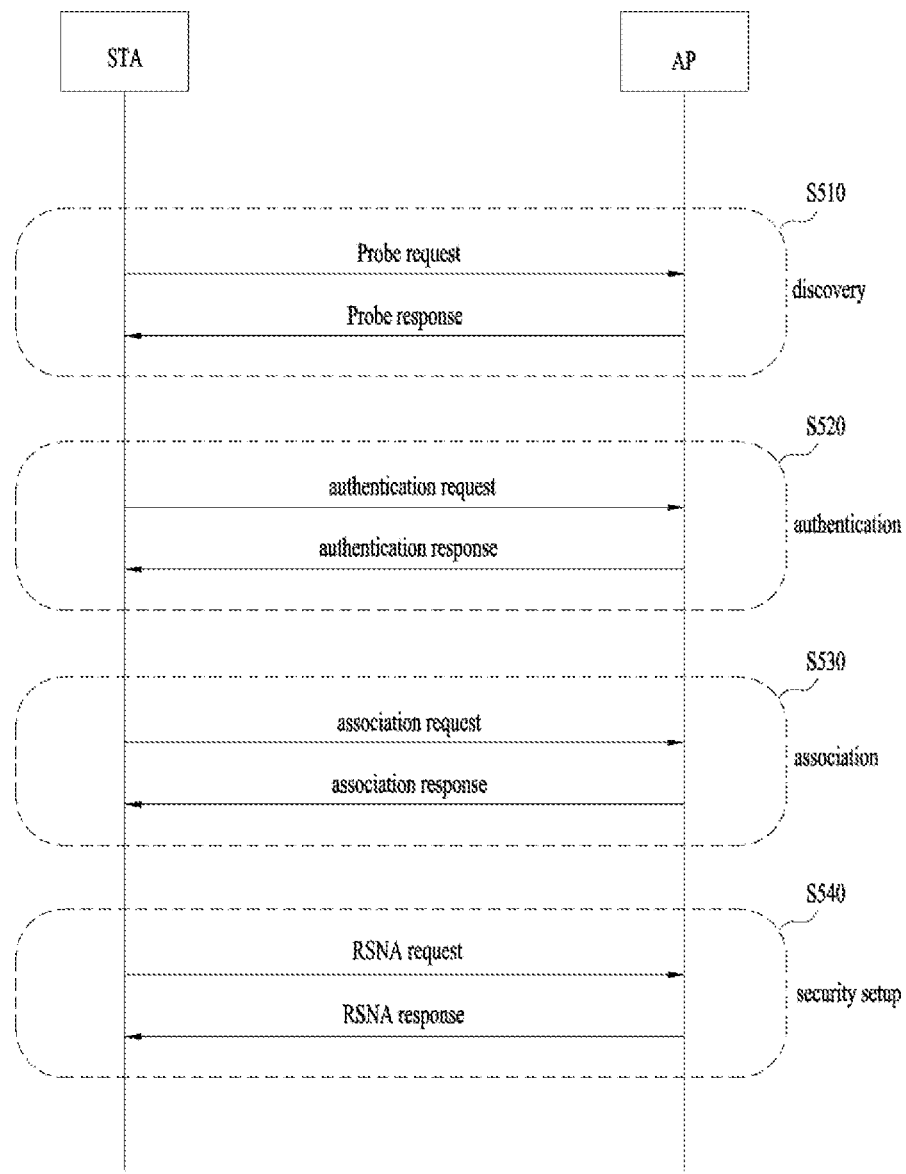
FIG. 5 is a diagram for explaining a link setup procedure in a wireless LAN system.

FIG. 5 is a diagram for explaining a general link setup process.

In order to allow an STA to establish link setup on a network and transmit/receive data over the network, the STA should perform processes of network discovery, authentication, association establishment, security setup, etc. The link setup process may also be referred to as a session initiation process or a session setup process. In addition, discovery, authentication, association, and security setup of the link setup process may also be called an association process.

An exemplary link setup process is described with reference to FIG. 5.

In step S510, an STA may perform a network discovery action. The network discovery action may include an STA scanning action. That is, in order to access the network, the STA should search for an available network. The STA needs to identify a compatible network before participating in a wireless network and the process of identifying the network present in a specific area is referred to as scanning.

Scanning is categorized into active scanning and passive scanning.

FIG. 5 exemplarily illustrates a network discovery action including an active scanning process. An STA performing active scanning transmits a probe request frame in order to determine which AP is present in a peripheral region while moving between channels and waits for a response to the probe request frame. A responder transmits a probe response frame in response to the probe request frame to the STA that has transmitted the probe request frame. Here, the responder may be an STA that has finally transmitted a beacon frame in a BSS of the scanned channel. Since an AP transmits a beacon frame in a BSS, the AP is a responder. In an IBSS, since STAs of the IBSS sequentially transmit the beacon frame, a responder is not the same. For example, an STA, that has transmitted the probe request frame at channel #1 and has received the probe response frame at channel #1, stores BSS-related information included in the received probe response frame, and moves to the next channel (e.g. channel #2). In the same manner, the STA may perform scanning (i.e. probe request/response transmission and reception at Channel #2).

Although not shown in FIG. 5, the scanning action may also be carried out using passive scanning. An STA that performs passive scanning awaits reception of a beacon frame while moving from one channel to another channel. The beacon frame is one of management frames in IEEE 802.11. The beacon frame is periodically transmitted to indicate the presence of a wireless network and allow a scanning STA to search for the wireless network and thus join the wireless network. In a BSS, an AP is configured to periodically transmit the beacon frame and, in an IBSS, STAs in the IBSS are configured to sequentially transmit the beacon frame. Upon receipt of the beacon frame, the scanning STA stores BSS-related information included in the beacon frame and records beacon frame information on each channel while moving to another channel. Upon receiving the beacon frame, the STA may store BSS-related information included in the received beacon frame, move to the next channel, and perform scanning on the next channel using the same method.

Active scanning is more advantageous than passive scanning in terms of delay and power consumption.

After discovering the network, the STA may perform an authentication process in step S520. The authentication process may be referred to as a first authentication process in order to clearly distinguish this process from the security setup process of step S540.

The authentication process includes a process in which an STA transmits an authentication request frame to an AP and the AP transmits an authentication response frame to the STA in response to the authentication request frame. The authentication frame used for authentication request/response corresponds to a management frame.

The authentication frame may include information about an authentication algorithm number, an authentication transaction sequence number, a state code, a challenge text, a robust security network (RSN), a finite cyclic group (FCG), etc. The above-mentioned information included in the authentication frame may correspond to some parts of information capable of being included in the authentication request/response frame and may be replaced with other information or include additional information.

The STA may transmit the authentication request frame to the AP. The AP may determine whether to permit authentication for the corresponding STA based on the information contained in the received authentication request frame. The AP may provide an authentication processing result to the STA through the authentication response frame.

After the STA has been successfully authenticated, an association process may be carried out in step S530. The association process includes a process in which the STA transmits an association request frame to the AP and the AP transmits an association response frame to the STA in response to the association request frame.

For example, the association request frame may include information associated with various capabilities, a beacon listen interval, a service set identifier (SSID), supported rates, supported channels, an RSN, a mobility domain, supported operating classes, a traffic indication map (TIM) broadcast request, interworking service capability, etc.

For example, the association response frame may include information associated with various capabilities, a status code, an association ID (AID), supported rates, an enhanced distributed channel access (EDCA) parameter set, a received channel power indicator (RCPI), a received signal to noise indicator (RSNI), a mobility domain, a timeout interval (association comeback time), an overlapping BSS scan parameter, a TIM broadcast response, a quality of service (QoS) map, etc.

The above-mentioned information may correspond to some parts of information capable of being contained in the association request/response frame and may be replaced with other information or include additional information.

After the STA has been successfully associated with the network, a security setup process may be performed in step S540. The security setup process of step S540 may be referred to as an authentication process based on robust security network association (RSNA) request/response. The authentication process of step S520 may be referred to as a first authentication process and the security setup process of step S540 may also be simply referred to as an authentication process.

The security setup process of step S540 may include a private key setup process through 4-way handshaking based on, for example, an extensible authentication protocol over LAN (EAPOL) frame. In addition, the security setup process may also be performed according to other security schemes not defined in IEEE 802.11 standards.

WLAN Evolution

To overcome limitations of communication speed in a WLAN, IEEE 802.11n has recently been established as a communication standard. IEEE 802.11n aims to increase network speed and reliability and extend wireless network coverage. More specifically, IEEE 802.11n supports a high throughput (HT) of 540 Mbps or more. To minimize transmission errors and optimize data rate, IEEE 802.11n is based on MIMO using a plurality of antennas at each of a transmitter and a receiver.

With widespread supply of a WLAN and diversified applications using the WLAN, the necessity of a new WLAN system for supporting a higher processing rate than a data processing rate supported by IEEE 802.11n has recently emerged. A next-generation WLAN system supporting very high throughput (VHT) is one of IEEE 802.11 WLAN systems which have been recently proposed to support a data processing rate of 1 Gbps or more in a MAC service access point (SAP), as the next version (e.g. IEEE 802.11ac) of an IEEE 802.11n WLAN system.

To efficiently utilize a radio frequency (RF) channel, the next-generation WLAN system supports a multiuser (MU)-MIMO transmission scheme in which a plurality of STAs simultaneously accesses a channel. In accordance with the MU-MIMO transmission scheme, an AP may simultaneously transmit packets to at least one MIMO-paired STA.

In addition, support of WLAN system operations in whitespace (WS) has been discussed. For example, technology for introducing the WLAN system in TV WS such as an idle frequency band (e.g. 54 to 698 MHz band) due to transition to digital TVs from analog TVs has been discussed under the IEEE 802.11af standard. However, this is for illustrative purposes only, and the WS may be a licensed band capable of being primarily used only by a licensed user. The licensed user is a user who has authority to use the licensed band and may also be referred to as a licensed device, a primary user, an incumbent user, etc.

For example, an AP and/or STA operating in WS should provide a function for protecting the licensed user. As an example, assuming that the licensed user such as a microphone has already used a specific WS channel which is a frequency band divided by regulations so as to include a specific bandwidth in the WS band, the AP and/or STA cannot use the frequency band corresponding to the corresponding WS channel in order to protect the licensed user. In addition, the AP and/or STA should stop using the corresponding frequency band under the condition that the licensed user uses a frequency band used for transmission and/or reception of a current frame.

Therefore, the AP and/or STA needs to determine whether a specific frequency band of a WS band can be used, in other words, whether a licensed user is present in the frequency band. A scheme for determining whether a licensed user is present in a specific frequency band is referred to as spectrum sensing. An energy detection scheme, a signature detection scheme, etc. are used as the spectrum sensing mechanism. The AP and/or STA may determine that the frequency band is being used by a licensed user if the intensity of a received signal exceeds a predetermined value or if a DTV preamble is detected.

Machine-to-machine (M2M) communication technology has been discussed as next generation communication technology. Technical standard for supporting M2M communication has been developed as IEEE 802.11ah in an IEEE 802.11 WLAN system. M2M communication refers to a communication scheme including one or more machines or may also be called machine type communication (MTC) or machine-to-machine communication. In this case, the machine refers to an entity that does not require direct manipulation or intervention of a user. For example, not only a meter or vending machine including a radio communication module but also a user equipment (UE) such as a smartphone capable of performing communication by automatically accessing a network without user manipulation/intervention may be machines. M2M communication may include device-to-device (D2D) communication and communication between a device and an application server. As exemplary communication between a device and an application server, communication between a vending machine and an application server, communication between a point of sale (POS) device and an application server, and communication between an electric meter, a gas meter, or a water meter and an application server. M2M communication-based applications may include security, transportation, healthcare, etc. In the case of considering the above-mentioned application examples, M2M communication has to support occasional transmission/reception of a small amount of data at low speed under an environment including a large number of devices.

More specifically, M2M communication should support a large number of STAs. Although a currently defined WLAN system assumes that one AP is associated with a maximum of 2007 STAs, methods for supporting other cases in which more STAs (e.g. about 6000 STAs) than 2007 STAs are associated with one AP have been discussed in M2M communication. In addition, it is expected that many applications for supporting/requesting a low transfer rate are present in M2M communication. In order to smoothly support these requirements, an STA in the WLAN system may recognize the presence or absence of data to be transmitted thereto based on a TIM element and methods for reducing the bitmap size of the TIM have been discussed. In addition, it is expected that much traffic having a very long transmission/reception interval is present in M2M communication. For example, a very small amount of data such as electric/gas/water metering needs to be transmitted and received at long intervals (e.g. every month). Accordingly, although the number of STAs associated with one AP increases in the WLAN system, methods for efficiently supporting the case in which there are a very small number of STAs each including a data frame to be received from the AP during one beacon period has been discussed.

As described above, WLAN technology is rapidly developing and not only the above-mentioned exemplary technologies but also other technologies including direct link setup, improvement of media streaming throughput, support of high-speed and/or large-scale initial session setup, and support of extended bandwidth and operating frequency are being developed.

Medium Access Mechanism

In a WLAN system based on IEEE 802.11, a basic access mechanism of medium access control (MAC) is a carrier sense multiple access with collision avoidance (CSMA/CA) mechanism. The CSMA/CA mechanism is also referred to as a distributed coordination function (DCF) of the IEEE 802.11 MAC and basically adopts a "listen before talk" access mechanism. In this type of access mechanism, an AP and/or an STA may sense a wireless channel or a medium during a predetermined time duration (e.g. DCF interframe space (DIFS) before starting transmission. As a result of sensing, if it is determined that the medium is in an idle status, the AP and/or the STA starts frame transmission using the medium. Meanwhile, if it is sensed that the medium is in an occupied state, the AP and/or the STA does not start its transmission and may attempt to perform frame transmission after setting and waiting for a delay duration (e.g. a random backoff period) for medium access. Since it is expected that multiple STAs attempt to perform frame transmission after waiting for different time durations by applying the random backoff period, collision can be minimized.

An IEEE 802.11 MAC protocol provides a hybrid coordination function (HCF) based on the DCF and a point coordination function (PCF). The PCF refers to a scheme of performing periodic polling by using a polling-based synchronous access method so that all reception APs and/or STAs can receive a data frame. The HCF includes enhanced distributed channel access (EDCA) and HCF controlled channel access (HCCA). EDCA is a contention based access scheme used by a provider to provide a data frame to a plurality of users. HCCA uses a contention-free based channel access scheme employing a polling mechanism. The HCF includes a medium access mechanism for improving QoS of a WLAN and QoS data may be transmitted in both a contention period (CP) and a contention-free period (CFP).

Figure 6:
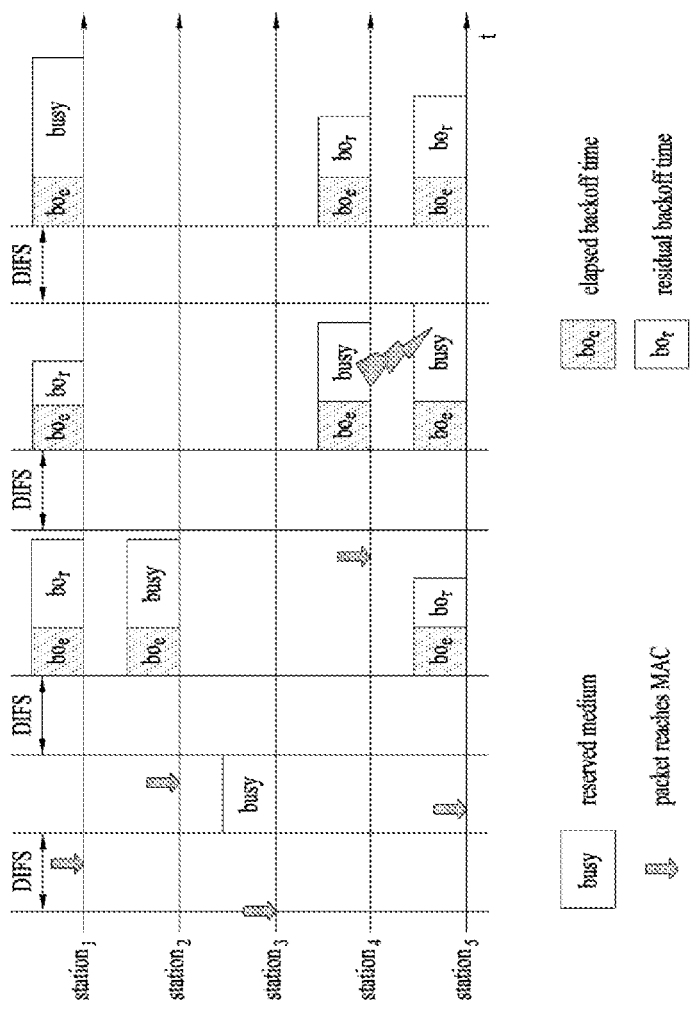
FIG. 6 is a diagram for explaining a backoff procedure.

FIG. 6 is a diagram for explaining a backoff process.

Operations based on a random backoff period will now be described with reference to FIG. 6. If a medium of an occupy or busy state transitions to an idle state, several STAs may attempt to transmit data (or frames). As a method for minimizing collision, each STA may select a random backoff count, wait for a slot time corresponding to the selected backoff count, and then attempt to start data or frame transmission. The random backoff count may be a pseudo-random integer and may be set to one of 0 to CW values. In this case, CW is a contention window parameter value. Although CWmin is given as an initial value of the CW parameter, the initial value may be doubled in case of transmission failure (e.g. in the case in which ACK for the transmission frame is not received). If the CW parameter value reaches CWmax, the STAs may attempt to perform data transmission while CWmax is maintained until data transmission is successful. If data has been successfully transmitted, the CW parameter value is reset to CWmin. Desirably, CW, CWmin, and CWmax are set to 2n−1 (where n=0, 1, 2, . . . ).

If the random backoff process is started, the STA continuously monitors the medium while counting down the backoff slot in response to the determined backoff count value. If the medium is monitored as the occupied state, the countdown stops and waits for a predetermined time. If the medium is in the idle status, the remaining countdown restarts.

As shown in the example of FIG. 6, if a packet to be transmitted to MAC of STA3 arrives at STA3, STA3 may confirm that the medium is in the idle state during a DIFS and directly start frame transmission. In the meantime, the remaining STAs monitor whether the medium is in the busy state and wait for a predetermined time. During the predetermined time, data to be transmitted may occur in each of STA1, STA2, and STA5. If it is monitored that the medium is in the idle state, each STA waits for the DIFS time and then may perform countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupation of STA2 is finished and the medium re-enters the idle state, each of STA1 and STA5 waits for a predetermined time DIFS and restarts backoff counting. That is, after counting down the remaining backoff time corresponding to the residual backoff time, each of STA1 and STA5 may start frame transmission. Since the residual backoff time of STA5 is shorter than that of STA1, STA5 starts frame transmission. Meanwhile, data to be transmitted may occur even in STA4 while STA2 occupies the medium. In this case, if the medium is in the idle state, STA4 may wait for the DIFS time, perform countdown in response to the random backoff count value selected thereby, and then start frame transmission. FIG. 6 exemplarily shows the case in which the residual backoff time of STA5 is identical to the random backoff count value of STA4 by chance. In this case, collision may occur between STA4 and STA5. Then, each of STA4 and STA5 does not receive ACK, resulting in occurrence of data transmission failure. In this case, each of STA4 and STA5 may increase the CW value by two times, select a random backoff count value, and then perform countdown. Meanwhile, STA1 waits for a predetermined time while the medium is in the occupied state due to transmission of STA4 and STA5. If the medium is in the idle state, STA1 may wait for the DIFS time and then start frame transmission after lapse of the residual backoff time.

STA Sensing Operation

As described above, the CSMA/CA mechanism includes not only a physical carrier sensing mechanism in which the AP and/or an STA directly senses a medium but also a virtual carrier sensing mechanism. The virtual carrier sensing mechanism can solve some problems such as a hidden node problem encountered in medium access. For virtual carrier sensing, MAC of the WLAN system may use a network allocation vector (NAV). The NAV is a value used to indicate a time remaining until an AP and/or an STA which is currently using the medium or has authority to use the medium enters an available state to another AP and/or STA. Accordingly, a value set to the NAV corresponds to a reserved time in which the medium will be used by an AP and/or STA configured to transmit a corresponding frame. An STA receiving the NAV value is not allowed to perform medium access during the corresponding reserved time. For example, NAV may be set according to the value of a 'duration' field of a MAC header of a frame.

A robust collision detection mechanism has been proposed to reduce the probability of collision. This will be described with reference to FIGS. 7 and 8. Although an actual carrier sensing range is different from a transmission range, it is assumed that the actual carrier sensing range is identical to the transmission range for convenience of description.

Figure 7:
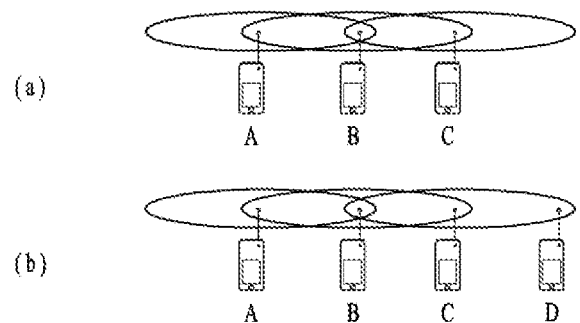
FIG. 7 is a diagram for explaining a hidden node and an exposed node.

FIG. 7 is a diagram for explaining a hidden node and an exposed node.

FIG. 7(a) exemplarily shows a hidden node. In FIG. 7(a), STA A communicates with STA B, and STA C has information to be transmitted. Specifically, STA C may determine that a medium is in an idle state when performing carrier sensing before transmitting data to STA B, although STA A is transmitting information to STA B. This is because transmission of STA A (i.e. occupation of the medium) may not be detected at the location of STA C. In this case, STA B simultaneously receives information of STA A and information of STA C, resulting in occurrence of collision. Here, STA A may be considered a hidden node of STA C.

FIG. 7(b) exemplarily shows an exposed node. In FIG. 7(b), in a situation in which STA B transmits data to STA A, STA C has information to be transmitted to STA D. If STA C performs carrier sensing, it is determined that a medium is occupied due to transmission of STA B. Therefore, although STA C has information to be transmitted to STA D, since the medium-occupied state is sensed, STA C should wait for a predetermined time until the medium is in the idle state. However, since STA A is actually located out of the transmission range of STA C, transmission from STA C may not collide with transmission from STA B from the viewpoint of STA A, so that STA C unnecessarily enters a standby state until STA B stops transmission. Here, STA C is referred to as an exposed node of STA B.

Figure 8:
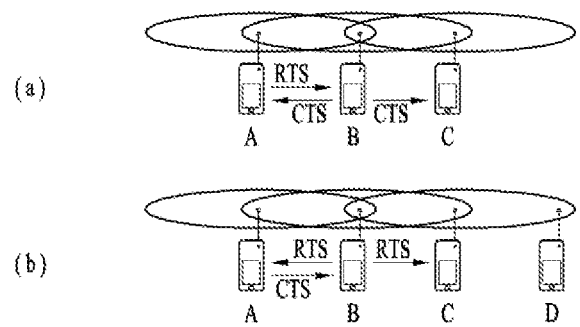
FIG. 8 is a diagram for explaining RTS and CTS.

FIG. 8 is a diagram for explaining request to send (RTS) and clear to send (CTS).

To efficiently utilize a collision avoidance mechanism under the above-mentioned situation of FIG. 7, it is possible to use a short signaling packet such as RTS and CTS. RTS/CTS between two STAs may be overheard by peripheral STA(s), so that the peripheral STA(s) may consider whether information is transmitted between the two STAs.

For example, if an STA to be used for data transmission transmits an RTS frame to an STA receiving data, the STA receiving data may inform peripheral STAs that itself will receive data by transmitting a CTS frame to the peripheral STAs.

FIG. 8(a) exemplarily shows a method for solving problems of a hidden node. In FIG. 8(a), it is assumed that both STA A and STA C are ready to transmit data to STA B. If STA A transmits RTS to STA B, STA B transmits CTS to each of STA A and STA C located in the vicinity of the STA B. As a result, STA C waits for a predetermined time until STA A and STA B stop data transmission, thereby avoiding collision.

FIG. 8(b) exemplarily shows a method for solving problems of an exposed node. STA C performs overhearing of RTS/CTS transmission between STA A and STA B, so that STA C may determine that no collision will occur although STA C transmits data to another STA (e.g. STA D). That is, STA B transmits RTS to all peripheral STAs and only STA A having data to be actually transmitted may transmit CTS. STA C receives only the RTS and does not receive the CTS of STA A, so that it can be recognized that STA A is located outside of the carrier sensing range of STA C.

Power Management

As described above, the WLAN system needs to perform channel sensing before an STA performs data transmission/reception. The operation of always sensing the channel causes persistent power consumption of the STA. Power consumption in a reception state is not greatly different from that in a transmission state. Continuous maintenance of the reception state may cause large load to a power-limited STA (i.e. an STA operated by a battery). Therefore, if an STA maintains a reception standby mode so as to persistently sense a channel, power is inefficiently consumed without special advantages in terms of WLAN throughput. In order to solve the above-mentioned problem, the WLAN system supports a power management (PM) mode of the STA.

The PM mode of the STA is classified into an active mode and a power save (PS) mode. The STA basically operates in the active mode. The STA operating in the active mode maintains an awake state. In the awake state, the STA may perform a normal operation such as frame transmission/reception or channel scanning. On the other hand, the STA operating in the PS mode is configured to switch between a sleep state and an awake state. In the sleep state, the STA operates with minimum power and performs neither frame transmission/reception nor channel scanning.

Since power consumption is reduced in proportion to a specific time in which the STA stays in the sleep state, an operation time of the STA is increased. However, it is impossible to transmit or receive a frame in the sleep state so that the STA cannot always operate for a long period of time. If there is a frame to be transmitted to an AP, the STA operating in the sleep state is switched to the awake state to transmit/receive the frame. On the other hand, if the AP has a frame to be transmitted to the STA, the sleep-state STA is unable to receive the frame and cannot recognize the presence of a frame to be received. Accordingly, the STA may need to switch to the awake state according to a specific period in order to recognize the presence or absence of a frame to be transmitted thereto (or in order to receive the frame if the AP has the frame to be transmitted thereto).

Figure 9:
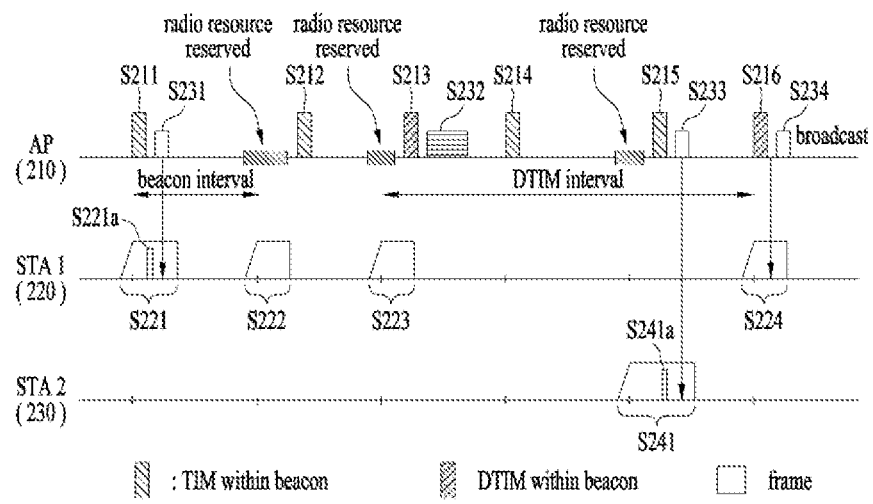
FIG. 9 is a diagram for explaining a power management operation.

FIG. 9 is a diagram for explaining a PM operation.

Referring to FIG. 9, an AP 210 transmits a beacon frame to STAs present in a BSS at intervals of a predetermined time period (S211, S212, S213, S214, S215, and S216). The beacon frame includes a TIM information element. The TIM information element includes buffered traffic regarding STAs associated with the AP 210 and includes information indicating that a frame is to be transmitted. The TIM information element includes a TIM for indicating a unicast frame and a delivery traffic indication map (DTIM) for indicating a multicast or broadcast frame.

The AP 210 may transmit a DTIM once whenever the beacon frame is transmitted three times. Each of STA1 220 and STA2 222 operate in a PS mode. Each of STA1 220 and STA2 222 is switched from a sleep state to an awake state every wakeup interval of a predetermined period such that STA1 220 and STA2 222 may be configured to receive the TIM information element transmitted by the AP 210. Each STA may calculate a switching start time at which each STA may start switching to the awake state based on its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state when the AP 210 first transmits the beacon frame (S211). STA1 220 may receive the beacon frame and obtain the TIM information element. If the obtained TIM element indicates the presence of a frame to be transmitted to STA1 220, STA1 220 may transmit a power save-Poll (PS-Poll) frame, which requests the AP 210 to transmit the frame, to the AP 210 (S221a). The AP 210 may transmit the frame to STA1 220 in response to the PS-Poll frame (S231). STA1 220 which has received the frame is re-switched to the sleep state and operates in the sleep state.

When the AP 210 secondly transmits the beacon frame, since a busy medium state in which the medium is accessed by another device is obtained, the AP 210 may not transmit the beacon frame at an accurate beacon interval and may transmit the beacon frame at a delayed time (S212). In this case, although STA1 220 is switched to the awake state in response to the beacon interval, STA1 does not receive the delay-transmitted beacon frame so that it re-enters the sleep state (S222).

When the AP 210 thirdly transmits the beacon frame, the corresponding beacon frame may include a TIM element configured as a DTIM. However, since the busy medium state is given, the AP 210 transmits the beacon frame at a delayed time (S213). STA1 220 is switched to the awake state in response to the beacon interval and may obtain a DTIM through the beacon frame transmitted by the AP 210. It is assumed that the DTIM obtained by STA1 220 does not have a frame to be transmitted to STA1 220 and there is a frame for another STA. In this case, STA1 220 may confirm the absence of a frame to be received in the STA1 220 and re-enters the sleep state so that the STA1 220 may operate in the sleep state. After transmitting the beacon frame, the AP 210 transmits the frame to the corresponding STA (S232).

The AP 210 fourthly transmits the beacon frame (S214). However, since it was impossible for STA1 220 to obtain information regarding the presence of buffered traffic associated therewith through previous double reception of a TIM element, STA1 220 may adjust the wakeup interval for receiving the TIM element. Alternatively, provided that signaling information for coordination of the wakeup interval value of STA1 220 is contained in the beacon frame transmitted by the AP 210, the wakeup interval value of the STA1 220 may be adjusted. In this example, STA1 220, which has been switched to receive a TIM element every beacon interval, may be configured to be switched to another operation state in which STA1 220 awakes from the sleep state once every three beacon intervals. Therefore, when the AP 210 transmits a fourth beacon frame (S214) and transmits a fifth beacon frame (S215), STA1 220 maintains the sleep state such that it cannot obtain the corresponding TIM element.

When the AP 210 sixthly transmits the beacon frame (S216), STA1 220 is switched to the awake state and operates in the awake state, so that the STA1 220 may obtain the TIM element contained in the beacon frame (S224). The TIM element is a DTIM indicating the presence of a broadcast frame. Accordingly, STA1 220 does not transmit the PS-Poll frame to the AP 210 and may receive the broadcast frame transmitted by the AP 210 (S234). In the meantime, the wakeup interval configured for STA2 230 may be longer than the wakeup interval of STA1 220. Accordingly, STA2 230 may enter the awake state at a specific time (S215) where the AP 210 fifthly transmits the beacon frame and receives the TIM element (S241). STA2 230 may recognize the presence of a frame to be transmitted thereto through the TIM element and transmit the PS-Poll frame to the AP 210 to request frame transmission (S241a). The AP 210 may transmit the frame to STA2 230 in response to the PS-Poll frame (S233).

In order to manage a PS mode shown in FIG. 9, the TIM element may include either a TIM indicating the presence or absence of a frame to be transmitted to the STA or include a DTIM indicating the presence or absence of a broadcast/multicast frame. The DTIM may be implemented through field setting of the TIM element.

Figure 10:
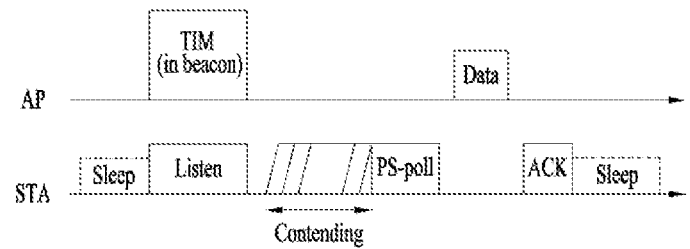
FIGS. 10 to 12 are diagrams for explaining an operation of an STA, which has received TIM, in detail.
Figure 11:
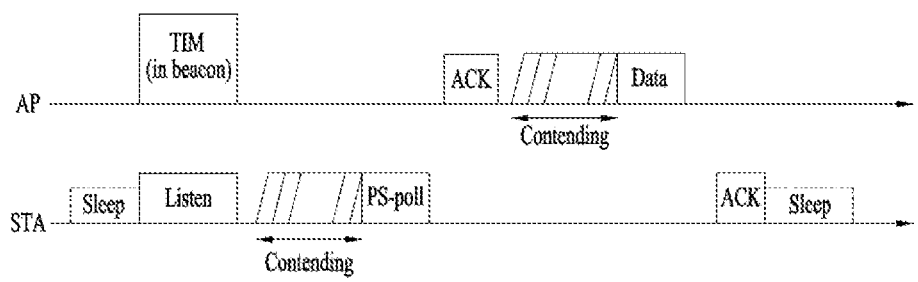
Figure 12:
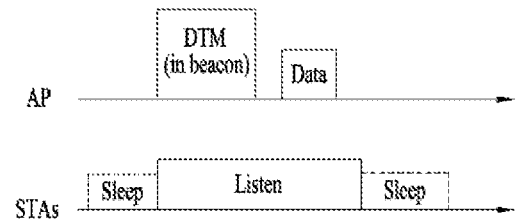

FIGS. 10 to 12 are diagrams for explaining detailed operations of an STA that has received a TIM.

Referring to FIG. 10, an STA is switched from a sleep state to an awake state so as to receive a beacon frame including a TIM from an AP. The STA may recognize the presence of buffered traffic to be transmitted thereto by interpreting the received TIM element. After contending with other STAs to access a medium for PS-Poll frame transmission, the STA may transmit the PS-Poll frame for requesting data frame transmission to the AP. Upon receiving the PS-Poll frame transmitted by the STA, the AP may transmit the frame to the STA. The STA may receive a data frame and then transmit an ACK frame to the AP in response to the received data frame. Thereafter, the STA may re-enter the sleep state.

As illustrated in FIG. 10, the AP may operate according to an immediate response scheme in which the AP receives the PS-Poll frame from the STA and transmits the data frame after a predetermined time (e.g. a short interframe space (SIFS)). Meanwhile, if the AP does not prepare a data frame to be transmitted to the STA during the SIFS time after receiving the PS-Poll frame, the AP may operate according to a deferred response scheme and this will be described with reference to FIG. 11.

The STA operations of FIG. 11 in which an STA is switched from a sleep state to an awake state, receives a TIM from an AP, and transmits a PS-Poll frame to the AP through contention are identical to those of FIG. 10. Even upon receiving the PS-Poll frame, if the AP does not prepare a data frame during an SIFS time, the AP may transmit an ACK frame to the STA instead of transmitting the data frame. If the data frame is prepared after transmission of the ACK frame, the AP may transmit the data frame to the STA after completion of contention. The STA may transmit the ACK frame indicating that the data frame has successfully been received to the AP and transition to the sleep state.

FIG. 12 illustrates an exemplary case in which an AP transmits a DTIM. STAs may be switched from the sleep state to the awake state so as to receive a beacon frame including a DTIM element from the AP. The STAs may recognize that a multicast/broadcast frame will be transmitted through the received DTIM. After transmission of the beacon frame including the DTIM, the AP may directly transmit data (i.e. the multicast/broadcast frame) without transmitting/receiving a PS-Poll frame. While the STAs continuously maintains the awake state after reception of the beacon frame including the DTIM, the STAs may receive data and then switch to the sleep state after completion of data reception.

TIM Structure

In case of a method of managing a power saving mode based on the TIM (DTIM) protocol mentioned earlier with reference to FIGS. 9 to 12, STAs can check whether or not there exists a data frame to be transmitted to the STAs via STA identification information included in a TIM element. The STA identification information may correspond to information related to an AID (association identifier) which is an identifier assigned to an STA when the STA is associated with an AP.

The AID is used as a unique identifier for each STA in a single BSS. As an example, the AID is assigned by a value among values ranging from 1 to 2007 in a current wireless LAN system. In a currently defined wireless LAN system, 14 bits can be assigned to a frame transmitted by an AP and/or an STA as the AID. Although a value of the AID can be assigned up to 16383, values ranging from 2008 to 16383 are configured as reserved values.

A TIM element according to a legacy definition is not suitable for being applied to an M2M application that many numbers (e.g., over 2007) of STAs are associated with a single AP. In case of expanding a legacy TIM structure as it is, since a size of a TIM bitmap becomes too large, it is unable to support with a legacy frame format and it is not appropriate for M2M communication considering an application of a low transmission rate. And. It is expected that the number of STAs in which a reception data frame exists during a single beacon interval is very small in M2M communication. Hence, in case of considering the aforementioned M2M communication application example, although a size of a TIM bitmap is enlarged, it is expected a case that most of bits has a value of 0 frequently occurs. Thus, a technology of efficiently compressing a bitmap is required.

As a legacy bitmap compression technology, there is a method of omitting contiguous 0's at the forepart of a bitmap and defining by an offset (or start point) value. Yet, if the number of STAs in which a buffered frame exists is less and a difference of an AID value of each STA is big, a compression efficiency of the method is not high. For example, when a frame, which is to be transmitted to 2 STAs respectively including an AID of 10 and an AID of 2000, is buffered only, although a length of a compressed bitmap corresponds to 1990, all bits have a value of 0 except both ends. If the number of STAs capable of being associated with a single AP is less, inefficiency of bitmap compression is not a big problem. Yet, if the number of STAs increases, the inefficiency may become an element deteriorating overall system performance.

As a method of solving the aforementioned problem, data transmission can be more efficiently performed in a manner of dividing an AID into a plurality of groups. A designated group ID (GID) is assigned to each of a plurality of the groups. The AID assigned based on a group is explained with reference to FIG. 13 in the following.

Figure 13:
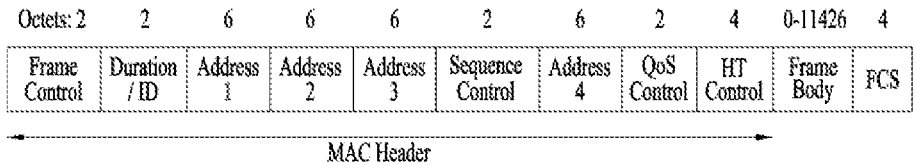
FIG. 13 is a diagram for an example of an MAC frame format of IEEE 802.11 system to which the present invention is applicable.

FIG. 13 (a) is a diagram for an example of an AID assigned based on a group. Referring to the example of FIG. 13 (a), several bits at the front of an AID bitmap can be used to indicate a GID. For example, first 2 bits of the AID bitmap can be used for indicating 4 GIDs. When the total length of an AID bitmap corresponds to N bits, a value of first 2 bits (B1 and B2) indicates a GID of the AID.

FIG. 13 (b) is a diagram for a different example of an AID assigned based on a group. Referring to the example of FIG. 13 (b), a GID can be assigned according to a position of an AID. In this case, AIDs using an identical GID can be represented by a value of an offset and a length. For example, if a GID 1 is represented by an offset A and a length B, it means that AIDs ranging from A to A+B−1 have the GID 1 on a bitmap. For example, in the example of FIG. 13 (b), assume that the total AIDs ranging from 1 to N4 are divided into 4 groups. In this case, AIDs belonging to the GID 1 correspond to AIDs ranging from 1 to N1 and the AIDs belonging to the GID 1 can be represented by an offset 1 and a length N1. AIDs belonging to a GID 2 can be represented by an offset N1+1 and a length N2−N1+1, AIDs belonging to a GID 3 can be represented by an offset N2+1 and a length N3−N2+1 and AIDs belonging to a GID 4 can be represented by an offset N3+1 and a length N4−N3+1.

As mentioned in the foregoing description, if an AID assigned based on a group is introduced, it is able to make channel access to be permitted in time section different from each other according to a GID. Hence, a TIM element deficiency problem for many numbers of STAs is solved and data can be efficiently transmitted and received. For example, channel access is permitted for STA(s) belonging to a specific group only during specific time section and the rest of STA(s) may have restriction on the channel access. A prescribed time section for which access is permitted for specific STA(s) may be called a RAW (restricted access window).

A channel access according to a GID is explained with reference to FIG. 13 (c). FIG. 13 (c) shows an example of a channel access mechanism according to a beacon interval when an AID is divided into 3 groups. A first beacon interval (first RAW) corresponds to an interval for which a channel access of an STA corresponding to an AID belonging to a GID 1 is permitted. Channel access of STAs belonging to a different GID is not permitted. To this end, A TIM element for AIDs corresponding to the GID 1 is included in the first beacon only. A TIM element for AIDs including a GID 2 is included in a second beacon frame. Hence, channel access of STAs corresponding to AIDs belonging to the GID 2 is permitted only during a second beacon interval (second RAW). A TIM element for AIDs including a GID 3 is included in a third beacon interval only. Hence, channel access of STAs corresponding to AIDs belonging to the GID 3 is permitted only during a third beacon interval (third RAW). The TIM element for the AIDs including the GID 1 is included again in a fourth beacon interval only. Hence, channel access of the STAs corresponding to the AIDs belonging to the GID 1 is permitted only during a fourth beacon interval (fourth RAW). Channel access of an STA belonging to a specific group, which is indicated by a TIM included in a corresponding beacon frame, is permitted only during each of beacon intervals after a fifth beacon interval (each of RAWs after a fifth RAW).

FIG. 13 (c) shows an example of a circular or periodical order of a GID which is permitted according to a beacon interval, by which the present invention may be non-limited.

In particular, if AID(s) belonging to a specific GID(s) is included in a TIM element, channel access of STA(s) corresponding to the specific AID(s) can be permitted during specific time interval (specific RAW) and channel access of the rest of STA(s) may not be permitted during the specific time interval.

As mentioned in the foregoing description, the group-based AID assignment scheme can also be called a hierarchical structure of a TIM. In particular, a total AID space is divided into a plurality of blocks and it is able to make channel access of STA(s) (i.e., STA of a specific group) corresponding to a specific block including a value except 0 to be permitted only. By doing so, a TIM of a large size is divided into a small blocks/groups, an STA can easily maintain TIM information and the blocks/groups can be easily managed according to a class of an STA, service quality (QoS), or a usage. Although the example shown in FIG. 13 shows a 2-level layer, it is able to configure a TIM of a hierarchical structure in a form equal to or greater than the 2 levels. For example, a total AID space is divided into a plurality of page groups, each page group is divided into a plurality of blocks and each block can be divided into a plurality of sub-blocks. In this case, as an extended example of the example shown in FIG. 13 (a), in an AID bitmap, first N1 number of bits indicate a page ID (i.e., PID), next N2 number of bits indicate a block ID, next N3 number of bits indicate a sub-block ID and the remaining bits can indicate an STA bit position in a sub-block.

In the examples of the present invention described in the following, it is able to apply various methods of dividing STAs (or AIDs assigned to each of the STAs) in a prescribed hierarchical group unit and managing the STAs. A group-based AID assignment scheme may be non-limited by the examples.

Examples of Frame Format

FIG. 13 is a diagram for an example of an MAC frame format of IEEE 802.11 system to which the present invention is applicable.

Referring to FIG. 13, a MAC frame format includes a MAC header (MHR), a MAC payload and a MAC footer (MFR). The MHR is defined by a region including a frame control field, a duration/ID field, an address 1 field, an address 2 field, an address 3 field, a sequence control field, an address 4 field, a QoS control field and a HT control field. A frame body field is defined by the MAC payload. Data intended to be transmitted by upper layer is positioned at the frame body field. The frame body field has a variable size. A frame check sequence (FCS) field is defined by the MAC footer and is used to detect an error of the MAC frame.

A minimum frame format is configured by the first three fields (the frame control field, the duration/ID field and the address 1 field) and a very last field (the FCS field). The first three fields and the last field exist in all frames. The remaining fields can exist in a specific frame type only.

Information included in each of the aforementioned fields may follow the definition of IEEE 802.11 system. And, the each of the aforementioned fields corresponds to an example of fields capable of being included in a MAC frame. Each field can be replaced with a different field or an additional field can be further included as well.

Figure 14:
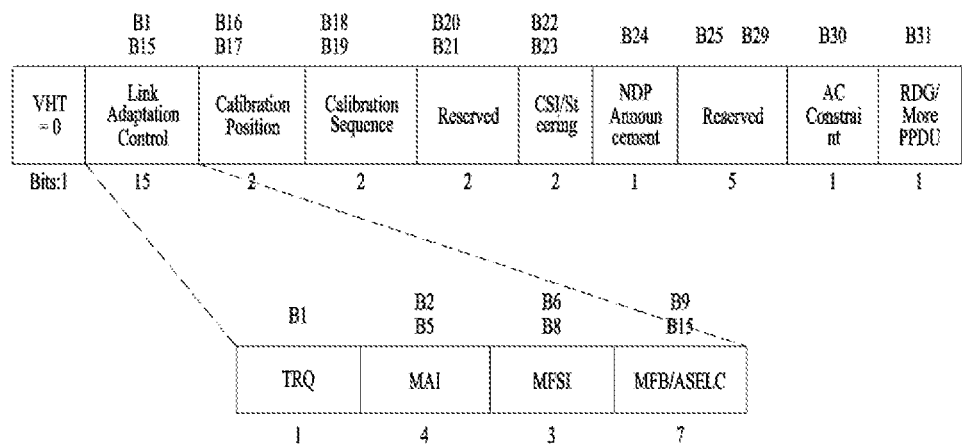
FIG. 14 is a diagram for an example of an HT format of an HT control field in an MAC frame.

FIG. 14 is a diagram for an example of an HT format of an HT control field in a MAC frame according to FIG. 13.

Referring to FIG. 14, the HT control field can include a VHT subfield, a link adaptation subfield, a calibration position subfield, a calibration sequence subfield, a channel state information (CSI)/steering subfield, an NDP (null data packet) announcement subfield, an AC (access category)

constraint subfield, an RDG (reverse direction grant/more) PPDU subfield and a reserved subfield.

The link adaptation subfield can include a training request (TRQ) subfield, an MAI (MCS (modulation and coding scheme) request or an ASEL (antenna selection) indication) subfield, an MCS feedback sequence indication (MFSI) subfield, an MCS feedback and antenna selection command/data (MFB/ASELC) subfield.

If a sounding PPDU is requested to a responder, the TRQ subfield is set to 1. If the sounding PPDU is not requested to the responder, the TRQ subfield is set to 0. And, if the MAI subfield is set to 14, it indicates an antenna selection indication (ASEL indication) and the MFB/ASELC subfield is interpreted by the antenna selection command/data. Otherwise, the MAI subfield indicates an MCS request and the MFB/ASELC subfield is interpreted by an MCS feedback. When the MAI subfield indicates an MCS request (MRO), if MCS feedback is not requested, the MAI subfield is set to 0. If the MCS is requested, the MAI subfield is set to 1. The sounding PPDU indicates a PPDU delivering a training symbol usable for channel estimation.

The aforementioned each of the subfields corresponds to an example of subfields capable of being included in the HT control field. Each field can be replaced with a different subfield. Or, an additional subfield can be further included.

Figure 15:
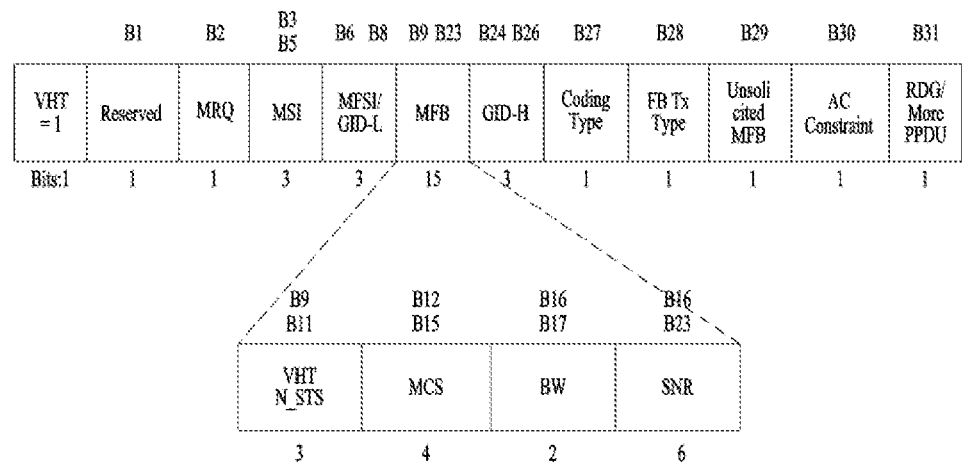
FIG. 15 is a diagram for an example of a VHT format of an HT control field in an MAC frame.

FIG. 15 is a diagram for an example of a VHT format of an HT control field in a MAC frame according to FIG. 13.

Referring to FIG. 15, the HT control field can include a VHT subfield, an MRO subfield, an MSI subfield, an MCS feedback sequence indication/group ID lowest bit (MFSI/GID-L: LSB of group ID) subfield, an MFB subfield, a group ID highest bit (GID-H: MSB of group ID) subfield, a coding type subfield, an MFC response transmission type (FB Tx type: transmission type of MFB response) subfield, an unsolicited MFB subfield, an AC constraint subfield, an RDG/more PPDU subfield. And, the MFB subfield can include a VHT space-time stream number (N_STS: number of space time streams) subfield, an MCS subfield, a bandwidth (BW) subfield and a signal to noise ratio (SNR) subfield.

Table 1 shows explanation on each subfield in a VHT format of the HT control field.

TABLE 1

| Subfield | Meaning | Definition |
| --- | --- | --- |
| MRQ | MCS request | If MCS feedback (solicited MFB) is requested, set to 1. Otherwise, set to 0. |
| MSI | MRO sequence identifier | If MRO subfield is set to 1, MSI subfield includes sequence number within a scope ranging from 0 to 6 identifying a specific request. If MRO subfield is set to 0, MSI subfield is reserved. |
| MFSI/GID-L | MFB sequence identifier/LSB of group ID | If unsolicited MFB subfield is set to 0, MFSI/GID-L subfield includes a reception value of MSI included in a frame indicated by MFB information. If unsolicited MFB subfield is set to 1, MFSI/GID-L subfield includes lowest 3 bits of a group ID of PPDU indicated by solicited MFB. |
| MFB | VHT N_STS, MCS, BW, SNR feedback | MFB subfield includes a recommended MFB. MCS = 15, VHT N_STS = 7 indicate that there is no feedback. |
| GID-H | MSB of group ID | If unsolicited MFB subfield is set to 1, GID-H subfield includes highest 3 bits of a group ID of PPDU indicated by the unsolicited MFB. |
| Coding type | Coding type of MFB response | If unsolicited MFB subfield is set to 1, coding type subfield includes 1 in case of coding information (BCC (binary convolution code)) indicated by the unsolicited MFB, 0 in case of LDPC (low-density parity check). Otherwise, reserved. |
| FB Tx type | Transmission type of MFB response | If unsolicited MFB subfield is set to 1 and FB Tx type subfield is set to 0, the unsolicited MFB indicates either unbeamformed VHT PPDU or transmit diversity using STBC (space-time block coding) VHT PPDU. If unsolicited MFB subfield is set to 1 and FB Tx type subfield is set to 1, the unsolicited MFB indicates beamformed SU-MIMO (single user MIMO) VHT PPDU. Otherwise, reserved. |
| Unsolicited MFB | Unsolicited MCS feedback indicator | If MFB is not a response of MRQ, set to 1. If MFB is a response of MRQ, set to 0. |
| Ac constraint | | If response for reverse direction grant (RDG) includes data frame from a traffic identifier (TID), set to 0. If response for reverse direction grant (RDG) includes a frame received from AC identical to last data frame received from an identical |

TABLE 1-continued

| Subfield | Meaning | Definition |
|---|---|---|
| RDG/more PPDU | | reverse direction (RD) initiator only, set to 1. When RDG/more PPDU subfield corresponds to 0, if reverse direction (RD) initiator transmits, it indicates there is no reverse direction grant (RDG). If reverse direction (RD) responder transmits, it indicates PPDU delivering MAC frame is last transmission. When RDG/more PPDU subfield corresponds to 1, if reverse direction (RD) initiator transmits, it indicates there exists reverse direction grant (RDG). If reverse direction (RD) responder transmits, there exist following different PPDU after PPDU delivering MAC frame. |

The aforementioned each of the subfields corresponds to an example of subfields capable of being included in the HT control field. Each field can be replaced with a different subfield. Or, an additional subfield can be further included.

In the meantime, the MAC sub-layer delivers an MAC protocol data unit (MPDU) to a physical layer as a physical service data unit (PSDU). A PCCP entity adds a physical header and a preamble to the received PSDU and generates a PLCP protocol data unit (PPDU).

FIG. 16 is a diagram for an example of a PPDU frame format of IEEE 802.11n system to which the present invention is applicable.

FIG. 16 (a) shows an example of a PPDU frame according to a non-HT format, an HT mixed format and an HT-greenfield format.

The non-HT format indicates a frame format for a legacy system (IEEE 802.11 a/g) STA. A non-HT format PPDU includes a legacy format preamble consisting of a legacy-short training field (L-STF), a legacy-long training field (L-LTF) and a legacy-signal (L-SIG) field.

The HT mixed format permits a communication with a legacy system STA and indicates a frame format for IEEE 802.11n STA at the same time. The HT mixed format PPDU includes a legacy format preamble consisting of the L-STF, the L-LTF and the L-SIG and an HT format preamble consisting of an HT-short training field (HT-STF), an HT-long training field (HT-LTF) and an HT-signal (HT-SIG) field. Since the L-STF, the L-LTF and the L-SIG mean legacy fields for backward compatibility, a part from the L-STF to the L-SIG is identical to the non-HT format. An STA can identify the mixed format PPDU using the HT-SIG field appearing after the part.

The HT-greenfield format is a format not compatible with a legacy system. The HT-greenfield format indicates a format used for an IEEE 802.11n STA. an HT-greenfield format PPDU includes a greenfield preamble consisting of an HT-greenfield-STF (HT-GF-STF), an HT-LTF1, an HT-SIG and one or more HT-LTFs.

A data field includes a service field, PSDU, tail bit and pad bit. All bits of the data field are scrambled.

FIG. 16 (b) shows the service field included in the data field. The service field has 16 bits. Each bit is numbered by 0 to 15. Each bit is sequentially transmitted from a bit #0. The bit #0 to a bit #6 are set to 0 and used to synchronize a descrambler installed in a receiving end.

FIG. 17 is a diagram for an example of a VHT PPDU frame format of IEEE 802.11ac system to which the present invention is applicable.

Referring to FIG. 17, a VHT format PPDU includes a legacy format preamble consisting of L-STF, L-LTF and L-SIG and a VHT format preamble consisting of VHT-SIG-A, HT-STF and HT-LTF before a data field. Since the L-STF, the L-LTF and the L-SIG mean a legacy field for backward compatibility, a part from the L-STF to the L-SIG is identical to the non-HT format. An STA can identify the VHT format PPDU using the VHT-SIG field appearing after the part.

The L-STF is a field used for frame detection, auto gain control (AGC) diversity detection, coarse frequency/time synchronization, and the like. The L-LTF is a field used for fine frequency/time synchronization, channel estimation, and the like. The L-SIG is a field used for transmitting legacy control information. The VHT-SIG-A is a VHT field used for transmitting control information included in VHT STAs in common. The VHT-STF is a field used for AGC for MIMO and a beamformed stream. The VHT-LTFs is a field used for channel estimation for MIMO and a beamformed stream. The VHT-SIG-B is a field used for transmitting control information specific to each STA. Structures of the VHT-SIG-A and the VHT-SIG-B are shown in FIG. 18 (a) and FIG. 18 (b), respectively.

Figure 19:
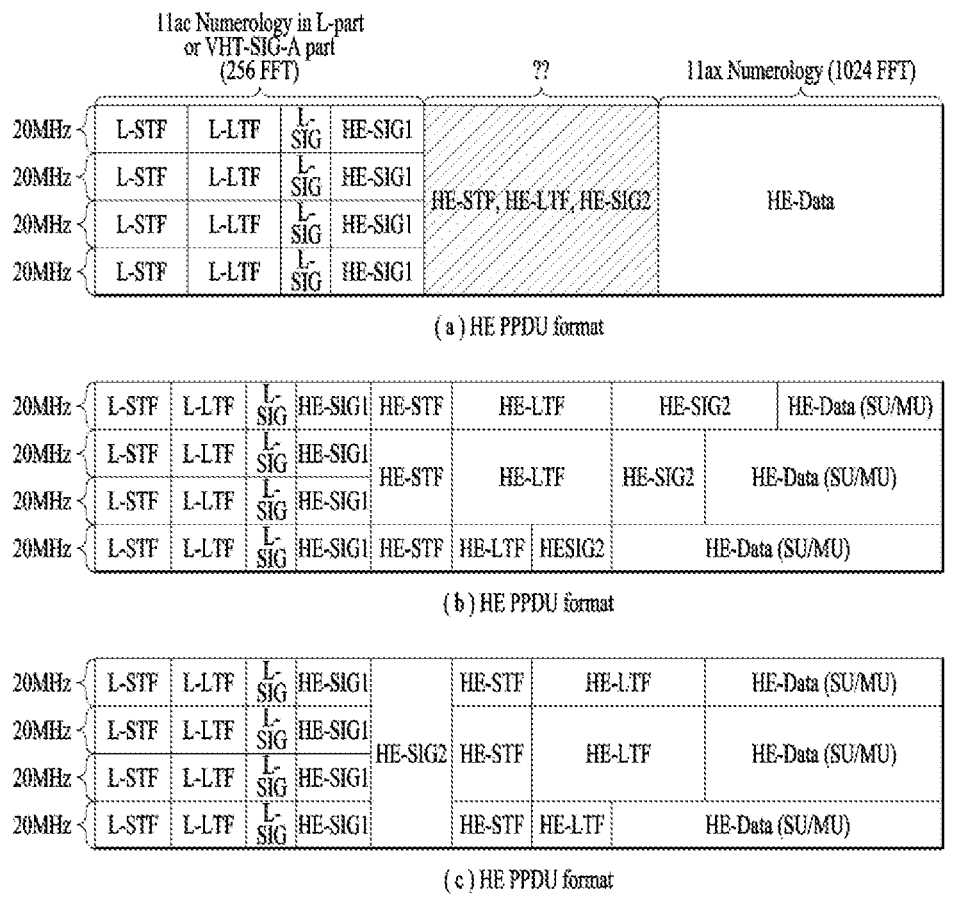

FIG. 19 is a diagram for an example of a PPDU format in 11ax.

Referring to the example of FIG. 19 (a), HE-SIG1 appears right after L-part (L-STF, L-LTF, L-SIG). Similar to the L-part, the HE-SIG1 is duplicated in a unit of 20 MHz The HE-SIG1 includes common information (BW, GI length, BSS index, CRC, Tail, etc.). Referring to the structure of FIG. 19 (b), the HE-SIG1 includes user allocation information (e.g., STA's ID (PAID or GID), allocated resource information, Nsts, etc.). HE-SIG2 is transmitted per OFDMA allocation. In case of performing MU-MIMO, the HE-SIG2 is identified by an STA via SDM. The HE-SIG2 includes additional user allocation information (e.g., MCS, coding, STBC, TXBE, etc.). Referring to FIG. 19 (c), the HE-SIG2 is transmitted immediately after the HE-SIG1 via information (numerology) of the HE-SIG1 over the full band. The HE-SIG2 includes user allocation information (e.g., STA AID, resource allocation information (e.g., allocation size), MCS, Nsts, coding, STBC, TXBF, etc.).

Figure 20:
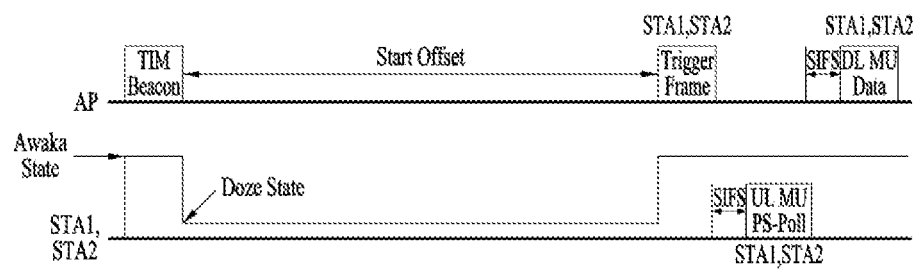
FIG. 20 is a diagram for an example of 11ax MU PS poll.

FIG. 20 is a diagram for an example of 1 lax MU PS poll. An AP transmits a TIM beacon frame. The TIM beacon frame can include information necessary for STAs performing MU transmission to receive a trigger frame (e.g., resource allocation, start offset, trigger frame transmission timing, etc.). If an STA receives a trigger frame from the AP, the STA can perform the MU transmission after prescribed time (e.g., SIFS). The AP can transmit DL MU data or ACK to the MU STA after SIFS.

Figure 21:
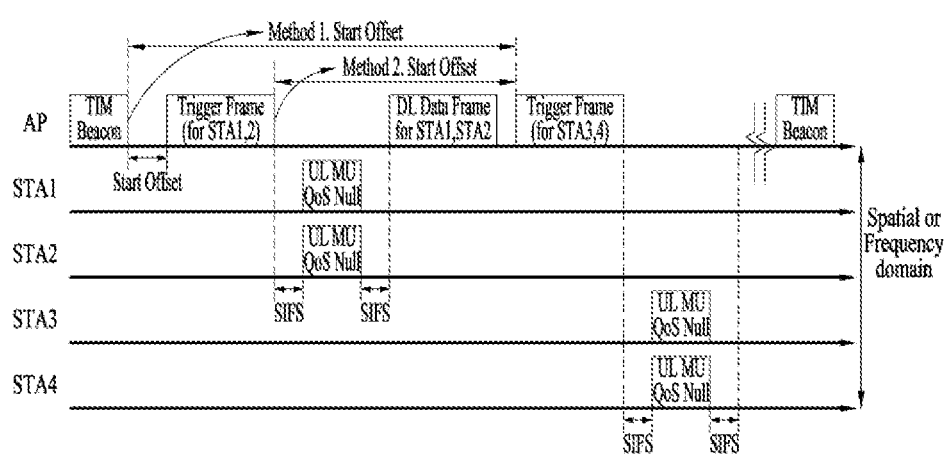
FIG. 21 is a diagram for an example of a UL MU U-APSD operation.

FIG. 21 is a diagram for an example of a UL MU U-APSD operation. If STAs receive TIM from an AP, the STAs obtain transmission information of a trigger frame, receive the trigger frame, and may be able to transmit a UL MU QoS null frame to the AP. Having received the UL MU QoS null frame, the AP can transmit DL data after SIFS. In this case, the transmission information of the trigger frame can be informed in a manner that TIM indicates a start offset of a trigger frame to be received by each STA (method 1) or each trigger frame indicates a start offset for a different STA (method 2).

Figure 22:
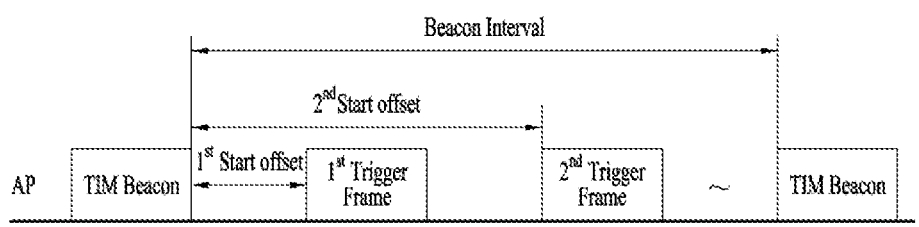
FIG. 22 is a diagram for an example of transmitting a plurality of trigger frames.

FIG. 22 is a diagram for an example of transmitting a plurality of trigger frames during a single beacon interval. In this case, a TIM beacon frame can transmit start off information for each of a plurality of the trigger frames.

In the following description, a method for an STA to determine whether to perform an EDCA is explained based on the aforementioned description. More specifically, a method for an AP to determine a UL status of an STA, a method for the AP to indicate the STA to switch an access method, and a method for the STA to switch an access method according to a specific status are explained. In case of coverage extension, a low power capacity STA, and the like, it is advantageous to perform MIMO transmission rather than an EDCA. Since a main entity capable of precisely identifying UL performance of an STA corresponds to an AP, if the AP determines a UL status of the STA and informs the STA of whether to perform an EDCA based on the UL status, it may be able to enhance system performance or reduce a transmission failure probability of the STA.

1. Method of Stopping EDCA Access

According to one embodiment of the present invention, an AP receives an uplink signal including prescribed information from an STA and may be able to determine whether to transmit information related to stopping of an EDCA to the STA based on at least one of the prescribed information and the uplink signal. If it is determined to transmit the information related to the stopping of the EDCA to the STA, the AP can transmit the information related to the stopping of the EDCA to the STA. In this case, the prescribed information or the uplink signal, which is used for determining whether to transmit the information related to the stopping of the EDCA to the STA, may include an MCS level and/or RSSI (or SNR, SINR, etc.) of a UL signal of the STA, an MCS level and/or a feedback value of a DL signal for the STA, information on a UL transmission-related delay or a UL retry count value, a More data field, a Channel load report value, a Data discard report value, a Retry Count value, an indicator, and the like. In the following, the information included in the prescribed information or the uplink signal is explained in detail.

1-1. Method of Stopping EDCA Access by AP

If one of an MCS level of an uplink signal and RSSI is equal to or less than a predetermined threshold value, an AP can transmit information related to stopping of an EDCA. In particular, if an MCS level of an STA is equal to or less than a threshold MCS level and/or if RSSI of a UL signal of the STA is equal to or less than a specific threshold value, the AP may inform the STA of the situation or may indicate the STA to stop the EDCA. Having received the information, i) the STA may lower a current MCS level, ii) if the current MCS level is equal to or lower than a prescribed threshold MCS level, the STA may stop an EDCA method, or iii) the STA stops the EDCA method irrespective of the current MCS level and performs a UL access through a random access or a scheduled access. For example, if an MCS level of a UL signal of the STA received by the AP corresponds to 1 and RSSI of the UL signal of the STA is equal to or less than a specific threshold value (e.g., −70 dbm), the AP can inform the STA of the status. If the STA receives the information from the AP, the STA lowers the current MCS level corresponding to 1 to an MCS level 0 and transmits the UL signal using the EDCA. Or, if the current MCS level of the STA is equal to or less than a prescribed MCS threshold level, the STA may stop the EDCA method and may be able to perform a UL access through a random access or a scheduled access.

Or, it may use an MCS level and/or a feedback value of a DL signal for the STA. If the MCS level of the DL signal for the STA is equal to or less than a threshold MCS level and/or if an SNR and/or SINR value among information fed back by the STA is equal to or less than a specific threshold value SNR and/or SINR value, the AP may inform the STA of the status or may indicate the STA to stop the EDCA. If the STA receives the information from the AP, the STA may stop the EDCA method and may be able to perform a UL access through a random access or a scheduled access. For example, if an MCS level of a DL signal received by the STA from the AP corresponds to 0 and an SNR value fed back by the STA is equal to or less than a specific threshold value (e.g., −70 dbm), the AP can inform the STA of the status. If the STA receives the information from the AP, the STA may stop the EDCA method and may be able to perform a UL access through a random access or a scheduled access.

The prescribed information corresponds to an uplink transmission attempt count of the STA. If the uplink transmission attempt count is equal to or greater than a predetermined threshold value, the AP can transmit information relate to stopping of the EDCA to the STA. In particular, when the STA transmits a UL signal, the STA feedbacks information on a UL transmission-related delay, a UL retry count value, and the like to the AP and the AP can indicate the STA to stop the EDCA using the feedback information. For example, when the STA performs access using the EDCA, if the STA fails to perform transmission more than a prescribed count, the STA transmits a UL signal to the AP through a random access or a scheduled access. For the STA, the AP stops the EDCA of the STA and may indicate the STA to transmit a UL signal using a random access or a scheduled access. In this case, the AP can transmit information on the prescribed count to the STA through a beacon or a probe response frame.

If data transmission delay of the STA is big, the AP can control the data transmission delay of the STA by transmitting a trigger frame for a random access or a scheduled access. By doing so, it may be able to control not only a low power STA but also time capable of occupying a channel by the STA via scheduling in dense environment. To this end, the AP may use information of a more data field transmitted from the STA, a channel load report value, a data discard report, a retry count value, indicator information, and the like.

When the STA transmits a reserved bit of SIG-B of a frame transmitted by the STA or a UL signal, if the STA fails to receive ACK/BA from the AP, the STA may inform the AP of the failure in receiving the ACK/BA using a newly defined field, signature or a reserved bit of Delimiter, a reserved bit of a MAC frame (e.g., a reserved bit of a HE control field), and the like. In this case, it may use a BSR frame, data, an ACK/BA frame, or the like.

Prescribed information corresponds to a more data field. The STA receives a more data field set to 1. If the STA fails to receive an uplink signal within a predetermined threshold value, the STA can transmit information related to stopping of EDCA. When the AP receives a UL frame of which information of the more data field transmitted from the STA is set to '1' (i.e., a buffer for UL transmission exists at queue of the STA), if transmission delay is greater than a specific threshold value until the AP receives a UL frame transmitted from the STA again, the AP makes the STA stop EDCA access and transmits a trigger frame for a random access or a scheduled access to trigger UL MU transmission. In this case, a threshold value of each transmission delay can be defined in advance according to an access category of the UL frame. Or, the AP may inform the STA of the information using a beacon frame or a probe response frame. Or, it may use information included in TSPEC of an ADDTA request action frame transmitted to the AP by the STA. For example, if transmission delay exceeds the threshold value, the AP can transmit a trigger frame for transmitting a UL frame (e.g., a trigger frame for BSR (buffer status report), a UL MU data frame, etc.) using such a value transmitted by the TSPEC as minimum/maximum service interval, delay bound, and the like or a threshold value of each transmission delay via a scheduled access in consideration of an access category of data transmitted by the STA. For example, when required max delay according to AC is defined (e.g., when required max delay corresponds to 2 ms when AC_VI), although the AP receives an AC_VI data frame of which information of the more data field transmitted from the STA is set to '1', if the AP receives the AC_VI data frame from the STA at 3 ms by exceeding the required max delay, the AP may transmit a trigger frame for transmitting a UL frame for the UL data transmission of the STA or a trigger frame for transmitting a BSR frame to schedule the STA for a scheduled access. And, although the more data field is not set to '1', it may be able to perform similar application according to an access category and a service interval of UL data transmitted by the STA.

If information received from the STA corresponds to information indicating that there is a data discarded by the STA, it may be able to transmit information related to stopping of EDCA. Specifically, the STA can inform the AP that there is a data discarded by the STA due to insufficient resource. In this case, the insufficient resource may correspond to not only a case that it is unable to transmit data until lifetime of data to be transmitted by the STA exceeds but also a case that retransmission is performed until a short/long RetryLimit value. In this situation, the STA can discard data and report the information to the AP. Having received the information, the AP makes the STA stop EDCA access. For UL transmission of a specific STA, the AP may transmit a trigger frame for a random access or a scheduled access. Or, the AP may transmit a trigger frame for transmitting a BSR frame to schedule the STA for a scheduled access. For example, if it is unable to transmit data until lifetime of data to be transmitted by the STA exceeds, the STA can report the AP that the STA has discarded the data because lifetime of the data to be transmitted by the STA exceeds via a random access. Having received the information from the STA, the AP makes the STA stop EDCA access. The AP transmits a trigger frame for a random access or a scheduled access for UL transmission of a specific STA or transmits a trigger frame for transmitting a BSR frame to schedule the STA for a scheduled access.

If the prescribed information corresponds to retry indicator information, the STA can transmit information related to stopping of EDCA. In this case, the retry indicator information may correspond to information included in an uplink signal when the STA fails to receive DL ACK/BA more than a predetermined count after UL transmission is performed. In particular, it may use a retry count value or an indicator. Specifically, when the STA performs UL transmission (using EDCA), if the STA fails to receive DL ACK/BA more than a prescribed count in response to the UL transmission, the STA can transmit the retry indicator information to the AP via a random access or a scheduled access. In this case, the AP can transmit information on the prescribed count to the STA using a beacon or a probe response frame. Or, when the STA performs UL transmission, if the STA fails to receive DL ACK/BA in response to the UL transmission, the STA can transmit retry count information to the AP. In this case, the retry count information can be restricted to a retry indicator or a retry count value using EDCA. Having received the retry count information, the AP makes the STA stop EDCA access. The AP transmits a trigger frame for a random access or a scheduled access for UL transmission of a specific STA or transmits a trigger frame for transmitting a BSR frame to schedule the STA for a scheduled access. For example, when the STA performs UL transmission (using EDCA), if the STA fails to receive DL ACK/BA more than a prescribed count in response to the UL transmission, the STA can transmit a retry indicator to the AP via a random access or a scheduled access. Having received the information from the STA, the AP makes the STA stops EDCA access. The AP transmits a trigger frame for a random access or a scheduled access for UL transmission of a specific STA or transmits a trigger frame for transmitting a BSR frame to schedule the STA for a scheduled access.

When the AP receives a channel load report value from the STA, if the channel load report value is equal to or greater than a specific threshold value of a specific STA, i.e., if a channel is busy with a specific ratio, the AP makes the STA stop EDCA access and transmits a trigger frame for a random access or a scheduled access for UL transmission of the specific STA. Or, if the channel load report value is equal to or greater than the specific threshold value, it may be able to newly define that the specific STA informs the AP of corresponding information. Having received the information, the AP may transmit a trigger frame for a scheduled access for UL transmission of the specific STA or a trigger frame for transmitting a BSR frame to schedule the STA for a scheduled access. In this case, the AP can transmit the specific threshold value using a beacon or a probe response frame. For example, if a channel load report value (a ratio of busy time during specific time) measured by the STA is equal to or greater than a specific threshold value, the STA informs the AP of the situation. Having received the situation, the AP transmits a trigger frame for transmitting a UL frame for UL data transmission of the STA or transmits a trigger frame for transmitting a BSR frame to schedule the STA for a scheduled access.

When the AP (re)transmits a DL signal for the STA and the AP fails to properly receive ACK/BA from the STA, if the situation is repeated more than a prescribed count, the AP may indicate the STA to stop EDCA. In this case, the AP can indicate the STA to stop EDCA only when an MCS level of DL data transmitted for the STA is equal to or less than a prescribed MCS level. Having received the indication, the STA stops the EDCA method and may be able to perform UL access via a random access or a scheduled access. For example, if the AP fails to properly receive ACK/BA from the STA in response to the DL data transmitted to the STA for more than 3 times, the AP can indicate the STA to stop EDCA. Having received the indication, the STA stops the EDCA and may be able to perform UL access by switching to a random access or a scheduled access method.

1-2. Method of Stopping/Switching EDCA Access by STA

If an MCS level of a UL signal of an STA is equal to or less than a threshold MCS level and/or if ACK/BA reception in response to the UL signal transmission fails for more than a prescribed count, i) the STA may lower a current MCS level, ii) if the current MCS level is equal to or lower than a prescribed threshold MCS level, the STA may stop EDCA and switch to a random access method or a scheduled access method, or iii) the STA stops the EDCA irrespective of the current MCS level and performs a UL access by switching to the random access method or the scheduled access method.

Or, if an MCS level for performing UL transmission of the STA is equal to or less than a threshold MCS level and/or when the STA (re)transmits a data/control/management frame to the AP and the STA fails to receive ACK/BA from the AP, if the situation is repeated for more than a prescribed count, i) the STA may lower a current MCS level, ii) if the current MCS level is equal to or lower than a prescribed threshold MCS level, the STA may stop EDCA and switch to a random access method or a scheduled access method, or iii) the STA stops the EDCA irrespective of the current MCS level and performs a UL access by switching to the random access method or the scheduled access method.

In this case, the AP can transmit the threshold MCS level of the STA and the information on the prescribed count to the STA when the AP and the STA performs STA capacity related configuration such as low-power capacity when the AP and the STA are associated with each other.

When the STA transmits a UL signal of the STA using EDCA, if the STA fails to receive ACK/BA from the AP (more than a prescribed count), the STA can inform the AP of the count. For example, if an MCS level for transmitting a UL signal of the STA corresponds to 1 (in this case, a threshold MCS level corresponds to 3) and the STA fails to receive ACK/BA from the AP in response to a signal transmitted to the AP for more than 3 times, i) the STA may lower the current MCS level 1 to an MCS level 0 or ii) the STA may stop EDCA irrespective of the current MCS level and can perform UL access through a random access. In this case, the STA can inform the AP of the failure in receiving the ACK/BA from the AP (more than the prescribed count).

If an MCS level of a DL signal transmitted by the AP is equal to or lower than a threshold MCS level or an SNR/SINR value is equal to or less than a threshold SNR and/or a threshold SINR level, i) the STA may lower a current MCS level for performing UL transmission, ii) if the current MCS level for performing UL transmission is equal to or less than a prescribed threshold MCS level, the STA may stop EDCA and switch to a random access method or a scheduled access method, or iii) the STA may stop EDCA irrespective of the current MCS level for performing UL transmission and switch to the random access method or the scheduled access method or perform UL access. In this case, the AP can transmit the threshold MCS level of the STA and the threshold SNR and/or the threshold SINR level to the STA when the AP and the STA performs STA capacity related configuration such as low-power capacity when the AP and the STA associated with each other. When the STA transmits a UL signal of the STA using EDCA, if the STA fails to receive ACK/BA from the AP (more than a prescribed count), the STA can inform the AP of the failure or the count of failure. For example, if an MCS level of a DL signal transmitted by the AP corresponds to 0 and a reception SNR is equal to or less than a predetermined specific threshold value (e.g., −6 dB), i) the STA may lower the current MCS level for transmitting a UL signal by one level or ii) the STA may stop EDCA irrespective of the current MCS level for transmitting the UL signal and can perform UL access by switching to a random access method or a scheduled access method. In this case, the STA can inform the AP of the failure in receiving the ACK/BA from the AP.

In this case, the AP can transmit the threshold RSSI (or, MCS level, SINR, SNR, etc.) and the prescribed count to the STA when the AP and the STA performs STA capacity related configuration such as low-power capacity when the AP and the STA are associated with each other. Or, the AP can transmit the threshold RSSI and the prescribed count to the STA using a beacon frame or a probe response frame. Or, it may reuse a short/long RetryLimit value previously transmitted by the AP. It may be able to indicate whether or not a random access of the STA is transmitted by additionally transmitting information corresponding to the abovementioned conditions to a random access trigger frame.

2. Method of Making EDCA Access to be Performed 2-1. Method of Making EDCA Access to be Performed by AP If an MCS level of the STA is equal to or greater than a threshold MCS level and/or if RSSI of a UL signal of the STA is equal to or greater than a specific threshold value, the AP may inform the STA of the situation or the AP may indicate the STA that access can be performed using EDCA. In this case, the RSSI of the UL signal of the STA can include reception signal strength only of a resource transmitted by the STA. To this end, it may apply a method for measuring the reception signal strength only of the resource transmitted by the STA. Having received the information from the AP, i) the STA may increase a current MCS level, ii) if the current MCS level is equal to or greater than a prescribed threshold MCS level, the STA may perform access using EDCA or iii) the STA can perform UL access using the EDCA method irrespective of the current MCS level. In this case, the AP can transmit the threshold MCS level of the STA to the STA when the AP and the STA performs STA capacity related configuration such as low-power capacity when the AP and the STA are associated with each other. For example, if the MCS level of the UL signal of the STA received by the AP corresponds to 9 and RSSI of the UL signal of the STA is equal to or greater than a specific threshold value (e.g., −60 dbm), the AP may inform the STA of the situation. Having received the information from the AP, the STA transmits the UL signal by increasing the current MCS level (i.e., 9) to an MCS level 10. Or, if the current MCS level of the STA is equal to or greater than a prescribed MCS threshold level, the STA may perform UL access using the EDCA method.

If an MCS level of a DL signal for the STA is equal to or greater than a threshold MCS level and/or SNR/SINR value among information fed back by the STA is equal to or greater than a specific threshold SNR and/or SINR value, the AP may inform the STA of the situation or may indicate the STA that the STA can perform access using EDCA. Having received the information from the AP, the STA can perform UL access using the EDCA method. For example, if an MCS level of a DL signal transmitted to the STA by the AP is equal to or greater than a specific threshold MCS level (e.g., 9) and an SNR value fed back by the STA is equal to or greater than a specific threshold value (e.g., −6 dbm), the AP can inform the STA of the situation. Having received the information from the AP, the STA can perform UL access using the EDCA method.

When the AP successfully receives a UL signal transmitted by a specific STA more than a prescribed count using a random access, if the UL signal does not include a field or bit information indicating that the STA fails to receive ACK/BA from the AP, the AP may inform the STA of the situation or may indicate the STA that the STA is able to perform access using the EDCA. In this case, the AP can inform the STA of the situation or may indicate the STA that the STA is able to perform access using the EDCA only when such an additional condition as an MCS level of the STA is equal to or greater than a prescribed MCS level and/or RSSI of the UL signal of the STA is equal to or greater than a specific threshold value are satisfied. Having received the information, i) the STA may increase a current MCS level, ii) if the current MCS level is equal to or greater than a prescribed threshold MCS level, the STA may perform access using EDCA or iii) the STA can perform access using the EDCA method irrespective of the current MCS level. For example, if an MCS level of a UL signal of the STA received by the AP corresponds to 9, RSSI of the UL signal of the STA is equal to or greater than a predetermined specific threshold value (e.g., −60 dbm), a UL signal transmitted by a specific STA is successfully received more than a prescribed count using a random access, and a field or bit information indicating a failure in receiving ACK/BA from the AP is not included in the UL signal transmitted by the STA, the AP can inform the STA of the situation or indicate that the STA is able to perform access using the EDCA. Having received the information from the AP, the STA can perform transmission by increasing the current MCS level (i.e., 9) to MCS level 10 or can perform UL access by switching to the EDCA method from the random access.

The AP may use a reserved bit of SIG-B, a field newly defined to indicate an access method of the STA, signature or reserved bit of Delimiter, a reserved bit (e.g., a reserved bit of a HE control field) of a MAC frame, a beacon frame, a probe response frame, or the like to inform the STA of the situation or indicate the STA to switch to EDCA from random access. The AP can transmit the aforementioned threshold RSSI (or MCS level, SINR, SNR, etc.), the prescribed count, and the like to the STA when the AP and the STA perform STA capacity-related configuration when the AP and the STA are associated with each other. Or, the AP can transmit the aforementioned threshold RSSI (or MCS level, SINR, SNR, etc.), the prescribed count, and the like to the STA using a beacon frame or a probe response frame. And, it may be able to set restriction on whether or not the STA performs random access transmission by additionally transmitting information corresponding to the aforementioned conditions to a random access trigger frame.

When the AP is able to perform access according to an STA using the EDCA method, it can be indicated by transmitting an EDCA parameter to an STA. For example, when the AP allocates a very large value to the STA as an EDCA parameter and the STA is unable to occupy a channel via EDCA, if the STA updates the EDCA parameter using an EDCA parameter transmitted by the AP and uses the EDCA parameter, it may increase a probability of occupying a channel. Hence, the STA can perform UL transmission by occupying a channel via the EDCA parameter update. To this end, the AP can newly define a frame indicating a change of a EDCA parameter according to an STA or a specific field in a MAC frame. Or, it may be able to transmit an EDCA parameter, which is applied when a specific condition is satisfied, to a beacon frame or a probe response frame. In this case, the specific condition may correspond to a trigger condition described in the preset specification.

When the AP allocates a resource for UL MU OFDMA to an STA, if the aforementioned situation occurs on the STA, the AP may allocate a resource having a wider bandwidth to the STA.

2-2. Method of Selecting/Performing EDCA Access by STA

If an MCS level for performing UL transmission is equal to or greater than a threshold MCS level and/or a situation that the STA (re)transmits a data/control/management frame to the AP and properly receives ACK/BA transmitted by the AP is repeated more than a prescribed count, i) the STA may increase the current MCS level, ii) if the current MCS level is equal to or greater than a prescribed threshold MCS level, the STA performs access using EDCA, or iii) the STA can perform UL access using the EDCA irrespective of the current MCS level. In this case, the AP can transmit the threshold MCS level of the STA or information on the prescribed count to the STA when the AP and the STA perform STA capacity-related configuration such as low-power capacity when the AP and the STA are associated with each other.

The STA can inform the AP of the situation. When the AP allocates a resource to a specific terminal by UL MU, the AP can allocate a wide bandwidth in consideration of the resource. For example, if an MCS level for transmitting a UL signal of the STA corresponds to 9 (in this case, a threshold MCS level corresponds to 8) and a situation that the STA transmits a signal to the AP and properly receives ACK/BA transmitted by the AP is repeated more than 3 times, i) the STA may increase the current MCS level 9 to an MCS level 10 or ii) the STA may perform UL access using EDCA method irrespective of the current MCS level.

When an MCS level of a DL signal transmitted by the AP is equal to or greater than a threshold MCS level and/or RSSI (or SNR, SINR value, etc.) is equal to or greater than a specific threshold value and if the MCS level of the DL signal transmitted by the AP is equal to or higher than the threshold MCS level and/or the SNR (or SINR, etc.) is equal to or higher than the threshold SNR (threshold SINR), i) if an MCS level for performing current UL transmission is equal to or greater than a prescribed threshold MCS level and/or RSSI is equal to or greater than a specific threshold value, the STA may perform access using the EDCA, or ii) the STA performs access using the EDCA irrespective of the MCS level for performing current UL transmission. In this case, the AP can transmit the threshold MCS level of the STA or the threshold value SNR and/or the threshold value SNR level to the STA when the AP and the STA perform STA capacity-related configuration such as low-power capacity when the AP and the STA are associated with each other.

When the AP allocates a resource to a specific terminal by UL MU, the AP can allocate a wide bandwidth in consideration of the resource. It may use a reserved bit of SIG-B, a field newly defined to indicate an access method of the STA, signature or reserved bit of Delimiter, a reserved bit (e.g., a reserved bit of a HE control field) of a MAC frame to inform the AP of the access method of the STA. For example, if an MCS level of a DL signal transmitted by the AP corresponds to 9 (in this case, a threshold MCS level corresponds to 8) and reception SNR corresponds to a predetermined specific threshold value (e.g., −6 dB), i) the STA may increase the current MCS level for transmitting a UL signal by one level or ii) the STA may perform UL access using EDCA method irrespective of the current MCS level of the UL signal.

In this case, the AP can transmit the threshold RSSI (or, MCS level, SINR, SNR, etc.) and the prescribed count to the STA when the AP and the STA performs STA capacity related configuration such as low-power capacity when the AP and the STA are associated with each other. Or, the AP can transmit the threshold RSSI and the prescribed count to the STA using a beacon frame or a probe response frame. And, it may be able to set restriction on whether or not the STA performs random access transmission by additionally transmitting information corresponding to the aforementioned conditions to a random access trigger frame.

In the aforementioned situation, the AP may use a reserved bit of SIG-B, a field newly defined to indicate an access method of the STA, signature or reserved bit of Delimiter, a reserved bit (e.g., a reserved bit of a HE control field) of a MAC frame, a beacon frame, a probe response frame, or the like to inform the STA of the situation or indicate the STA to switch to a random access or a scheduled access method from the EDCA. Or, the AP may control an EDCA parameter according to an STA. In this case, the AP may configure a very large value as a Cmin value for the EDCA. Or, the AP may transmit an EDCA parameter, which is applied when a specific condition is satisfied, to a beacon or a probe response frame. In this case, the specific condition may correspond to a trigger condition described in the present specification. By doing so, the AP can make the STA have no chance to perform access using the EDCA.

In this case, the AP can transmit the threshold RSSI (or, MCS level, SINR, SNR, etc.) and the prescribed count to the STA when the AP and the STA performs STA capacity related configuration such as low-power capacity when the AP and the STA are associated with each other. Or, the AP can transmit the threshold RSSI and the prescribed count to the STA using a beacon frame or a probe response frame. And, it may be able to set restriction on whether or not the STA performs random access transmission by additionally transmitting information corresponding to the aforementioned conditions to a random access trigger frame.

When the AP allocates a resource for UL MU OFDMA to an STA, if the aforementioned situation occurs on the STA, the AP may allocate a resource having a narrower bandwidth to the STA.

3. Method of Making Both EDCA and Random Access not to be Performed

When a specific STA performs coverage extension, if link quality is poor, the STA may continuously attempt access. In this case, it is necessary for the AP to set restriction on the STA. This is because it is highly probable that the continuous access of the STA not only increases a collision probability but also occupies a channel for transmission for a long time. The AP may set restriction on the access of the STA for load balance. If a specific condition is satisfied, the AP may set restriction on the STA to make the STA not to perform both EDCA and random access.

The AP can indicate the STA not to perform the EDCA and the random access according to a specific situation. Having received the indication from the AP, the STA disconnects a connection with the AP and may be able to perform scanning to find out a different AP. In order for the AP to provide the indication to the STA, specific bits are added to SIG or a MAC header may provide the indication. As an example of indicating the STA not to perform the EDCA and the random access, it may be able to newly define a frame to indicate a status of the STA.

For example, 1) if an MCS level of a UL signal received from a specific STA is equal to or less than a specific threshold value, 2) if RSSI (or SINR, SNR, etc.) of a UL signal received from a specific STA is equal to or less than a specific threshold value, 3) if an MCS level of a DL signal transmitted to a specific STA is equal to or less than a specific threshold value, 4) if information (SNR or SINR) fed back to the AP by an STA is equal to or less than a specific threshold value, the AP can indicate the STA not to perform the EDCA and the random access. Having received the indication, the STA does not perform the EDCA and the random access on the AP and perform scanning to find out a different AP.

In some cases, the STA may autonomously determine not to perform the EDCA or the random access. In order for the AP to set restriction on the STA to make the STA not to perform UL transmission on the AP using the EDCA or the random access, the AP can transmit an RSSI (or SINR, SNR, etc.) threshold value, an MCS threshold value level, a transmission delay threshold value, a failure count threshold value (or data discard count), and the like to the STA via a beacon, a probe response frame, or the like. Having received the threshold value, if a specific condition is satisfied, the STA does not perform the EDCA and the random access on the AP and performs scanning to find out a different AP. For example, if an RSSI (or SINR, SNR, etc.) of a signal received from the AP is equal to or less than the RSSI (or SINR, SNR, etc.) threshold value transmitted to the STA by the AP, the STA does not perform the EDCA and the random access on the AP. In this case, the STA can perform scanning to find out a different AP.

As a different example, if an MCS level of a UL frame transmitted to the AP is equal to or less than the MCS threshold value level received from the AP, the STA does not perform the EDCA and the random access on the AP and perform scanning to find out a different AP.

As a further different example, if an MCS level of a DL signal received from the AP is equal to or less than the MCS threshold value level received from the AP, the STA does not perform the EDCA and the random access on the AP and perform scanning to find out a different AP.

As a further different example, when the STA performs UL transmission, if a transmission delay threshold value exceeds the transmission delay threshold value received from the AP, the STA does not perform the EDCA and the random access on the AP and perform scanning to find out a different AP.

As a further different example, when the STA performs UL transmission, if a transmission failure count (or data discard count) exceeds the transmission failure count threshold value (or data discard count threshold value) received from the AP, the STA does not perform the EDCA and the random access on the AP and perform scanning to find out a different AP.

Figure 23:
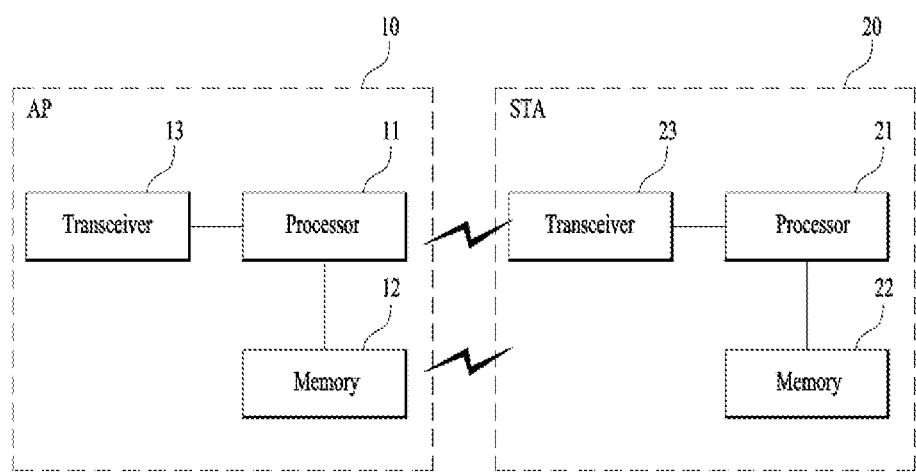
FIG. 23 is a block diagram for a configuration of a wireless device according to one embodiment of the present invention.

FIG. 23 is a block diagram for a configuration of a wireless device according one embodiment of the present invention.

An AP 10 can include a processor 11, a memory 12, and a transceiver 13. An STA 20 can include a processor 21, a memory 22, and a transceiver 23. The transceiver 13/23 can transmit and receive a radio signal. For example, the transceiver can implement a physical layer according to IEEE 802 system. The processor 11/21 can implement a physical layer and/or a MAC layer according to IEEE 802 system in a manner of being connected with the transceiver 13/23. The processor 11/21 can be configured to perform operations according to the aforementioned various embodiments of the present invention. And, a module for implementing the operations of the AP and the STA according to various embodiment of the present invention is stored in the memory 12/22 and can be executed by the processor 11/21. The memory 12/22 is included in the inside of the processor 11/21 or is installed in the outside of the processor 11/21 and can be connected with the processor 11/21 via a well-known means.

The above AP and the STA may be configured in such a manner that the above-described various embodiments of the present invention may be implemented independently or in combination of two or more. A redundant description is omitted for clarity.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the aforementioned various embodiments of the present invention are described with reference to examples applied to IEEE 802.11 system, it can be applied to various kinds of wireless communication systems using the same manner.

What is claimed is:

1. A method of transmitting and receiving a frame in a wireless communication system, the method comprising:
performing, by a station (STA), an enhanced distributed channel access (EDCA) in order to acquire a transmission opportunity (TXOP);
transmitting, by the STA, an uplink frame to an access point (AP) for a time interval related to the TXOP when the TXOP is acquired by the STA;
performing, by the STA, a retransmission operation for the uplink frame when an acknowledgement (ACK) frame for the uplink frame is not received within a predetermined waiting time,
wherein an uplink retransmission attempt counter of the STA is updated after performing the retransmission operation;
determining, by the STA, whether the updated uplink retransmission attempt counter exceeds a predetermined threshold value;
suspending, by the STA, the EDCA based on determining that the updated uplink retransmission attempt counter exceeds the predetermined threshold value;
receiving, by the STA, a trigger frame scheduling an uplink transmission of the STA from the AP after the EDCA is suspended; and
transmitting, by the STA, operating information related to the updated retransmission counter to the AP in response to the trigger frame.

2. A station (STA) in a wireless communication system, the STA comprising:
a transceiver; and
a processor,
wherein the processor is configured to:
perform an enhanced distributed channel access (EDCA) in order to acquire a transmission opportunity (TXOP);
control the transceiver to transmit an uplink frame to an access point (AP) for a time interval related to the TXOP when the TXOP is acquired by the STA;
perform a retransmission operation for the uplink frame when an acknowledgement (ACK) frame for the uplink frame is not received within a predetermined waiting time,
wherein an uplink retransmission attempt counter of the STA is updated after performing the retransmission operation;
determine whether the updated uplink retransmission attempt counter exceeds a predetermined threshold value;
suspend the EDCA based on determining that the updated uplink retransmission attempt counter exceeds the predetermined threshold value;
control the transceiver to receive a trigger frame scheduling an uplink transmission of the STA from the AP after the EDCA is suspended; and
control the transceiver to transmit operating information related to the updated retransmission counter to the AP in response to the trigger frame.

* * * * *